US011148361B2

(12) United States Patent
Jiang et al.

(10) Patent No.: US 11,148,361 B2
(45) Date of Patent: *Oct. 19, 2021

(54) ADDITIVE PROCESSING OF FLUOROELASTOMERS

(71) Applicant: 3M INNOVATIVE PROPERTIES COMPANY, St. Paul, MN (US)

(72) Inventors: Xuan Jiang, Maplewood, MN (US); Jeffrey N. Bartow, West Saint Paul, MN (US); Dirk H. C. Arren, Wijndgem (BE); Fee Zentis, Waging am See (DE); Klaus Hintzer, Kastl (DE); Gabriele H. Gottschalk-Gaudig, Mehring (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/071,730

(22) PCT Filed: Jan. 19, 2017

(86) PCT No.: PCT/US2017/014174
§ 371 (c)(1),
(2) Date: Jul. 20, 2018

(87) PCT Pub. No.: WO2017/127569
PCT Pub. Date: Jul. 27, 2017

(65) Prior Publication Data
US 2019/0030794 A1    Jan. 31, 2019

Related U.S. Application Data

(60) Provisional application No. 62/281,349, filed on Jan. 21, 2016, provisional application No. 62/385,439, filed on Sep. 9, 2016, provisional application No. 62/408,504, filed on Oct. 14, 2016.

(51) Int. Cl.
| | |
|---|---|
| *B29C 64/165* | (2017.01) |
| *C08L 27/18* | (2006.01) |
| *B33Y 80/00* | (2015.01) |
| *B33Y 10/00* | (2015.01) |
| *B33Y 70/00* | (2020.01) |
| *C08L 23/12* | (2006.01) |
| *C08F 259/08* | (2006.01) |
| *B33Y 30/00* | (2015.01) |
| *B33Y 40/00* | (2020.01) |
| *B29C 64/106* | (2017.01) |
| *B29C 64/30* | (2017.01) |
| *C08F 214/26* | (2006.01) |
| *C09D 11/101* | (2014.01) |
| *C09D 11/106* | (2014.01) |
| *B29K 27/18* | (2006.01) |
| *B29K 27/00* | (2006.01) |
| *B33Y 40/20* | (2020.01) |
| *B29C 64/124* | (2017.01) |
| *B29K 105/00* | (2006.01) |
| *B29K 27/12* | (2006.01) |

(52) U.S. Cl.
CPC .......... *B29C 64/165* (2017.08); *B29C 64/106* (2017.08); *B29C 64/30* (2017.08); *B33Y 10/00* (2014.12); *B33Y 30/00* (2014.12); *B33Y 40/00* (2014.12); *B33Y 70/00* (2014.12); *B33Y 80/00* (2014.12); *C08F 214/26* (2013.01); *C08F 259/08* (2013.01); *C08L 23/12* (2013.01); *C08L 27/18* (2013.01); *C09D 11/101* (2013.01); *C09D 11/106* (2013.01); *B29C 64/124* (2017.08); *B29K 2027/12* (2013.01); *B29K 2027/14* (2013.01); *B29K 2027/16* (2013.01); *B29K 2027/18* (2013.01); *B29K 2105/0094* (2013.01); *B33Y 40/20* (2020.01); *C08L 2205/05* (2013.01)

(58) Field of Classification Search
CPC .................................................. B29C 64/165
See application file for complete search history.

(56) References Cited

U.S. PATENT DOCUMENTS

| | | | |
|---|---|---|---|
| 2,434,058 | A | 1/1948 | Stenzel |
| 2,965,595 | A | 12/1960 | Brinker |
| 2,968,649 | A | 1/1961 | Pailthrop |
| 3,051,677 | A | 8/1962 | Rexford |
| 3,318,854 | A | 5/1967 | Honn et al. |
| 3,850,590 | A | 11/1974 | Chalkley et al. |
| 3,855,191 | A | 12/1974 | Doughty, Jr. |
| 4,120,608 | A | 10/1978 | Vassiliou |

(Continued)

FOREIGN PATENT DOCUMENTS

| | | |
|---|---|---|
| CN | 1326828 A | 12/2001 |
| CN | 102205524 A | 10/2011 |

(Continued)

OTHER PUBLICATIONS

Drummer, "Development of a Characterization Approach for the Sintering Behavior of New Thermoplastics for Selective Laser Sintering", Physics Procedia, 2010, vol. 5, pp. 533-542.

Goodridge, "Laser Sintering of Polyamides and Other Polymers", Progress in Materials Science, 2012, vol. 57, pp. 229-267.

Rietzel, "New Thermoplastic Powder for Selective Laser Sintering", Kunststoffe International-Online Magazine for Plastics, Jan. 2008, vol. 98, No. 2, pp. 42-45.

(Continued)

*Primary Examiner* — Nathan T Leong
(74) *Attorney, Agent, or Firm* — Thomas M Spielbauer

(57) ABSTRACT

Provided are method of producing a shaped fluoroelastomer articles. The methods include subjecting a composition comprising a fluoroelastomer to additive processing in an additive processing device. Also provided are articles obtained with the methods and 3D-printable compositions.

18 Claims, No Drawings

(56) References Cited

U.S. PATENT DOCUMENTS

| | | |
|---|---|---|
| 4,281,092 A | 7/1981 | Breazeale |
| 4,349,650 A | 9/1982 | Krespan |
| 4,558,141 A | 12/1985 | Squire |
| 4,605,773 A | 8/1986 | Maloney |
| 4,612,351 A | 9/1986 | Caporiccio |
| 4,808,651 A | 2/1989 | Blickle |
| 5,077,870 A | 1/1992 | Melbye et al. |
| 5,178,644 A | 1/1993 | Huzinec |
| 5,229,480 A | 7/1993 | Uschold |
| 5,285,002 A | 2/1994 | Grootaert |
| 5,378,782 A | 1/1995 | Grootaert |
| 5,442,097 A | 8/1995 | Obermeier et al. |
| 5,554,680 A | 9/1996 | Ojakaar |
| 5,565,512 A | 10/1996 | Saito et al. |
| 5,621,145 A | 4/1997 | Saito et al. |
| 5,658,063 A | 8/1997 | Nasserbakht |
| 5,688,884 A | 11/1997 | Baker |
| 5,700,859 A | 12/1997 | Ogura |
| 5,700,879 A | 12/1997 | Yamamoto et al. |
| 5,763,552 A | 6/1998 | Feiring |
| 5,767,204 A | 6/1998 | Iwa et al. |
| 5,891,965 A | 4/1999 | Worm et al. |
| 5,895,799 A | 4/1999 | Wu |
| 5,905,545 A | 5/1999 | Poradish et al. |
| 6,025,307 A | 2/2000 | Chittofrati |
| 6,103,843 A | 8/2000 | Abusleme |
| 6,126,849 A | 10/2000 | Yamana |
| 6,132,660 A | 10/2000 | Kampfer |
| 6,255,535 B1 | 7/2001 | Schulz et al. |
| 6,255,536 B1 | 7/2001 | Worm et al. |
| 6,294,627 B1 | 9/2001 | Worm et al. |
| 6,429,258 B1 | 8/2002 | Morgan et al. |
| 6,472,452 B2 | 10/2002 | Ruepping |
| 6,495,213 B2 | 12/2002 | Ruepping |
| 6,506,460 B1 | 1/2003 | Paglia |
| 6,562,415 B2 | 5/2003 | Ruepping |
| 6,587,159 B1 | 7/2003 | Dewald |
| 6,599,586 B2 | 7/2003 | Ruepping |
| 6,602,557 B2 | 8/2003 | Ruepping |
| 6,613,941 B1 | 9/2003 | Felix et al. |
| 6,706,193 B1 | 3/2004 | Burkard et al. |
| 6,746,723 B2 | 6/2004 | Paglia |
| 6,794,550 B2 | 9/2004 | Hintzer et al. |
| 6,803,391 B2 | 10/2004 | Paglia |
| 7,018,541 B2 | 3/2006 | Hintzer et al. |
| 7,164,397 B2 | 1/2007 | Pettitt et al. |
| 7,360,905 B2 | 4/2008 | Davis et al. |
| 7,569,273 B2 | 8/2009 | Bredt |
| 8,097,673 B2 | 1/2012 | Jones |
| 8,354,170 B1 | 1/2013 | Henry |
| 8,705,133 B2 | 4/2014 | Lieb et al. |
| 8,820,944 B2 | 9/2014 | Vasquez |
| 8,969,500 B2 | 3/2015 | Hintzer et al. |
| 2003/0138580 A1 | 7/2003 | Blong |
| 2003/0162923 A1 | 8/2003 | Funaki |
| 2004/0091298 A1 | 5/2004 | Nellen |
| 2004/0171736 A1 | 9/2004 | Dadalas |
| 2005/0003189 A1* | 1/2005 | Bredt .......... B29C 64/165 428/402 |
| 2005/0006811 A1 | 1/2005 | Blong |
| 2006/0251535 A1 | 11/2006 | Pfeifer et al. |
| 2006/0290032 A1 | 12/2006 | Sano |
| 2007/0015937 A1 | 1/2007 | Hintzer et al. |
| 2007/0031791 A1 | 2/2007 | Cinader, Jr. et al. |
| 2007/0232753 A1 | 10/2007 | Monsheimer et al. |
| 2009/0233045 A1 | 9/2009 | Slama et al. |
| 2010/0283188 A1 | 11/2010 | Rohner et al. |
| 2011/0172338 A1 | 7/2011 | Murakami |
| 2012/0129982 A1 | 5/2012 | Zipplies et al. |
| 2012/0201960 A1 | 8/2012 | Hartmann |
| 2013/0040142 A1 | 2/2013 | Frey et al. |
| 2013/0081599 A1 | 4/2013 | Collet |
| 2013/0010981 A1 | 5/2013 | Xie et al. |
| 2014/0080066 A1 | 3/2014 | Meya et al. |
| 2014/0113105 A1 | 4/2014 | Yasukochi |
| 2015/0125334 A1* | 5/2015 | Uetani .......... B22F 3/008 419/6 |
| 2015/0218296 A1 | 8/2015 | Kaspar et al. |
| 2016/0126631 A1 | 5/2016 | Yosui et al. |
| 2016/0185962 A1 | 6/2016 | Zhou et al. |
| 2016/0318250 A1 | 11/2016 | Moussa |
| 2016/0332370 A1 | 11/2016 | Arai et al. |
| 2017/0015848 A1 | 1/2017 | Aruga |
| 2017/0157842 A1 | 6/2017 | Sato et al. |
| 2017/0283655 A1 | 10/2017 | Kennet et al. |
| 2017/0342303 A1 | 11/2017 | Stevenson et al. |
| 2018/0126631 A1 | 5/2018 | Nauka et al. |
| 2018/0250877 A1 | 9/2018 | Okamoto et al. |
| 2018/0298155 A1 | 10/2018 | Hosoda et al. |
| 2019/0184632 A1 | 6/2019 | Achten et al. |

FOREIGN PATENT DOCUMENTS

| | | |
|---|---|---|
| CN | 202088120 U | 12/2011 |
| CN | 103264361 A | 8/2013 |
| CN | 103273432 A | 9/2013 |
| CN | 103762093 | 4/2014 |
| CN | 104140668 A | 11/2014 |
| CN | 104440597 A | 3/2015 |
| CN | 104530668 A | 4/2015 |
| CN | 103476570 B | 11/2015 |
| CN | 105017734 A | 11/2015 |
| CN | 105081992 A | 11/2015 |
| CN | 103709737 | 3/2016 |
| CN | 105711104 | 6/2016 |
| EP | 0 003 063 A2 | 7/1979 |
| EP | 0 086 397 A2 | 8/1983 |
| EP | 0 466 422 A1 | 1/1992 |
| EP | 0752432 | 8/1999 |
| EP | 0712882 | 4/2000 |
| EP | 0969027 | 10/2003 |
| EP | 1 666 234 A1 | 6/2006 |
| EP | 1148072 | 8/2009 |
| EP | 1059342 | 7/2010 |
| EP | 2 251 185 A1 | 11/2010 |
| EP | 1529785 | 3/2011 |
| EP | 1097948 | 6/2011 |
| EP | 1533325 | 10/2011 |
| EP | 2 592 116 A1 | 5/2013 |
| EP | 2488347 | 3/2014 |
| EP | 2 881 430 A1 | 6/2015 |
| EP | 2902424 | 8/2015 |
| JP | S61-198678 A | 9/1986 |
| JP | H06-262693 A | 9/1994 |
| JP | 2002-337167 A | 11/2002 |
| JP | 2005-297325 A | 10/2005 |
| JP | 2010-106102 A | 5/2010 |
| WO | 98/09798 A1 | 3/1998 |
| WO | 99/47615 A1 | 9/1999 |
| WO | WO 2000-009603 | 2/2000 |
| WO | WO 2000-022002 | 4/2000 |
| WO | WO 2000-071590 | 11/2000 |
| WO | WO 2001-046107 | 6/2001 |
| WO | 01/78969 A2 | 10/2001 |
| WO | 2002/045907 A2 | 6/2002 |
| WO | WO 2003-051988 | 6/2003 |
| WO | WO 2003-059992 | 7/2003 |
| WO | 2004/113042 A2 | 12/2004 |
| WO | WO 2004-113042 | 12/2004 |
| WO | WO 2006-065334 | 6/2006 |
| WO | 2006/091519 A2 | 8/2006 |
| WO | WO 2007-133912 | 11/2007 |
| WO | WO2007133912 | * 11/2007 |
| WO | WO 2008-140914 | 11/2008 |
| WO | 2010/151610 A2 | 12/2010 |
| WO | WO 2011-014715 | 2/2011 |
| WO | WO 2011-139807 | 11/2011 |
| WO | WO 2012-012289 | 1/2012 |
| WO | WO 2012-018603 | 2/2012 |
| WO | WO 2012-166546 | 12/2012 |
| WO | WO 2013-123156 | 8/2013 |
| WO | WO 2015-006697 | 1/2015 |
| WO | 2015/193819 A2 | 12/2015 |
| WO | 2017/014784 A1 | 1/2017 |

(56) References Cited

FOREIGN PATENT DOCUMENTS

| WO | 2017/083255 A1 | 5/2017 |
| --- | --- | --- |
| WO | 2017/116678 A1 | 7/2017 |
| WO | 2017/116679 A1 | 7/2017 |
| WO | 2017/117035 A1 | 7/2017 |
| WO | 2017/127569 A1 | 7/2017 |
| WO | WO 2017-127392 | 7/2017 |
| WO | WO 2017-127561 | 7/2017 |
| WO | WO 2017-127572 | 7/2017 |
| WO | WO 2018-118956 | 6/2018 |
| WO | WO 2017-173009 | 10/2018 |

OTHER PUBLICATIONS

Wendel, "Additive Processing of Polymers", Macromolecular Materials and Engineering, 2008, vol. 293, pp. 799-809.

International Search Report for PCT International Application No. PCT/US2017/014156, dated Apr. 28, 2017, 4 pages.

International Search Report for PCT International Application No. PCT/US2017/014174, dated May 11, 2017, 5 pages.

International Search Report for PCT International Application No. PCT/US2017/014181, dated May 3, 2017, 4 pages.

Bommel, "Drying of Silica Gels with Supercritical Carbon Dioxide", Journal of Materials Science, 1994, vol. 29, pp. 943-948.

Francis, "Ternary Systems of Liquid Carbon Dioxide", The Journal of Physical Chemistry, 1954, vol. 58, pp. 1099-1114.

Hintzer, "Fluoropolymer, Organic", Ullmann's Encyclopedia of Industrial Chemistry, 7th Edition, 2013, pp. 35-38.

Logothetis, "Chemistry of Fluorocarbon Elastomers", Progress in Polymer Science, 1989, vol. 14, No. 2, pp. 251-296.

Mchugh, "Supercritical Fluid Extraction: Principles and Practice", Department of Chemical Engineering, 2nd Edition, 1986, pp. 1-10.

Scheirs, "Modern Fluoropolymers: High Performance Polymers for Diverse Applications", Wiley Series in Polymer Science, 1997, pp. 1-6.

Smith, Handbook of Fluoropolymer Sceince and Technology, 377-391, (2014).

https://www.ifam.fraunhofer.de/en/Profile/Locations/Dresden.html, 7 pages.

International Search Report for PCT International Application No. PCT/IB2018/055355, dated Feb. 8, 2019, 7 pages.

International Search Report for PCT International Application No. PCT/US2018/040234, dated Oct. 19, 2018, 6 pages.

\* cited by examiner

ADDITIVE PROCESSING OF FLUOROELASTOMERS

CROSS REFERENCE TO RELATED APPLICATIONS

This application is a national stage filing under 35 U.S.C. 371 of PCT/US2017/014174, filed Jan. 19, 2017, which claims the benefit of Provisional Application No. 62/281,349, filed Jan. 21, 2016, and Provisional Application No. 62/385,439, filed Sep. 9, 2016 and Provisional Application No. 62/408,504, filed Oct. 14, 2016, the disclosures of which are incorporated by reference in their entirety herein.

FIELD

The present disclosure relates to additive processing of fluoroelastomers, to fluoroelastomer articles obtained by additive processing, and to fluoroelastomer compositions useful for additive processing.

BACKGROUND

Fluoropolymers are widely used as raw materials for their chemical inertness, in particular for articles requiring low friction properties and/or inertness to chemical reactivity, heat, or both.

Fluoropolymers are typically classified into thermoplastics, non-melt processable fluoropolymers and elastomers (sometimes also referred to as fluororubbers).

Fluorothermoplastics can be processed by conventional melt shaping methods, such as injection molding and extrusion. Fluorothermoplastics typically are copolymers of tetrafluoroethylene (TFE) with one or more other perfluorinated, partially fluorinated or non-fluorinated comonomers. Copolymers of TFE and perfluorinated alkyl or allyl ethers are known in the art as PFA's (perfluorinated alkoxy polymers). Copolymers of TFE and hexafluoropropylene (HFP) with or without other perfluorinated comonomers are known in the art as FEP's (fluorinated ethylene propylene). Copolymers of TFE, HFP and vinylidenefluoride (VDF) are known in the art as THV. Other types of melt-processable fluoropolymers are based on vinylidenefluoride homo- or copolymers, known in the art as PVDF. Copolymers of TFE and ethylene are known as ETFE.

Non-melt processable fluoropolymers include homopolymers of TFE or copolymers of TFE with other copolymerizable perfluorinated monomers, wherein the amount of comonomers is limited to less than 1% wt. Such TFE homo- and copolymers are referred to in the art as PTFE. PTFE has such a high melt viscosity that it cannot be processed by conventional melt processing techniques such as extrusion, injection molding or blow molding. Instead PTFE articles typically are produced by paste extrusion, or by sintering to produce blocks or billets which are then shaped into articles. For example by skiving, turning, machining (i.e., subtractive methods where material is removed to shape articles).

Fluoroelastomers, typically are copolymers of TFE and at least one other fluorinated comonomer, typically an alpha-olefin and have a glass transition temperature below 25° C. Most commonly used comonomers include HFP and VDF or perfluorinated alkyl vinyl ethers (PAVE's). Fluoroelastomers are curable into a three-dimensional network to produce rubber-like materials (also called fluororubbers). Fluoroelastomer articles are typically shaped by die cutting or injection molding.

In WO2007/133912 A2 an additive manufacturing process for special thermoplastic fluoropolymers (PVDF and PCTF) are described but examples are not provided. In CN103709737 A and CN 105711104 A methods for 3D printing are described where the use of PTFE is mentioned. The materials are processed by irradiating a polymer powder with infrared or lasers and melting the powder in selected areas exposed to the IR- or laser irradiation. These methods are known in the art of 3D-printing as laser melting or laser sintering. In U.S. Pat. No. 7,569,273 B2 a different method is described that is reported to be suitable for PVDF. Examples are also not provided. The method described in U.S. Pat. No. 7,569,273 B2 involves adding a fluid through a nozzle to a solid composition comprising the polymer and an adhesive particulate material. The articulate material becomes adhesive upon contact with the fluid and thus is reported to create an article by distributing the fluid on selected areas.

There is a need to provide fluoroelastomer articles by additive manufacturing, in particular for curable or cured fluoropolymers.

SUMMARY

In one aspect there is provided a method of producing a fluoropolymer article comprising subjecting a composition to additive processing in an additive processing device containing at least one energy source, wherein the composition comprises fluoropolymer particles and a binder material capable of binding the fluoropolymer particles to form a layer in a part of the composition that has been exposed to the energy source of the additive processing device and the method comprises subjecting a part of the composition to exposure of the energy source to form a layer and wherein the fluoropolymer is a fluoroelastomer.

In another aspect there is provided a composition for producing an article by additive processing in an additive processing device, said composition comprising fluoropolymer particles, optionally one or more filler, and a binder material capable of binding the fluoropolymer particles upon exposure of the binder material to energy from an energy source of the additive processing device; wherein the fluoropolymer is a fluoroelastomer.

In a further aspect there is provided a composition comprising a 3D-printed fluoroelastomer.

In yet another aspect there is provided an article comprising a 3D-printed fluoroelastomer, the article being selected from friction bearings, piston bearings, gaskets, shaft seals, ring lip seals, washer seals, O-rings, valve seats, connectors and lids.

DETAILED DESCRIPTION

The present Applicants have observed that it is difficult to create fluoropolymer articles, in particular fluoroelastomers, having a complex design with the traditional methods. Shaping articles by removing excess fluoropolymer (for example through skiving or die cutting) wastes expensive fluoropolymer material. Articles produced by injection molding are less wasteful, however the construction of molds can be expensive and time consuming. Rapid prototyping to identify optimized article designs by traditional methods, therefore, can be economically impractical.

Therefore, there is a need to provide alternative production methods for producing fluoropolymer articles.

Before any embodiments of this disclosure are explained in detail, it is to be understood that the disclosure is not limited in its application to the details of construction and the arrangement of components set forth in the following description. Also, it is to be understood that the phraseology and terminology used herein is for the purpose of description. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

All references cited herein are incorporated by reference unless stated otherwise.

Unless specified otherwise, cited norms (e.g. DIN, ASTM, ISO etc) are the versions in force in Jan. 1, 2016. In case a norm had expired before Jan. 1, 2016 the most recent active version is meant.

The present Applicants have found that fluoroelastomer articles can be prepared by additive processing. The fluoroelastomers are provided as a composition that is suitable for additive processing and can then be processed into a three dimensional article by additive processing, typically, in an additive processing device. Various known additive processing techniques may be used and also various known additive processing devices or 3D printers may be used. Such 3D printable compositions contain the fluoroelastomer and additional material that is capable of binding fluoroelastomer particles into a volume element or a layer either by (i) melting or liquefying or (ii) by polymerizing or solidifying upon the material being exposed to an energy source, typically the energy source of the additive processing device. Fluoroelastomer containing layers may be created successively to form a three-dimensional object. After the creation of the article in the additive processing device the additional material may be removed, typically by heat treatment which may include degradation or combustion. This step may be followed by other work-up steps, which may include, for example, curing of the article.

An advantage of the methods provided herein is that not only prototypes of fluoroelastomer articles can be produced at low costs but also fluoroelastomer articles of complex shape and design may be created that may not be available through conventional fluoropolymer processing or only at higher costs.

The methods provided herein are also less wasteful because unreacted 3D printable compositions may be reused in a next 3D print run.

Additive Processing

Additive processing, also known as "3D printing", or "additive manufacturing (AM)", refers to a process to create a three-dimensional object by sequential deposition of materials in defined areas, typically by generating successive layers of material. The object is typically produced under computer control from a 3D model or other electronic data source by an additive printing device typically referred to as a 3D printer. The term "3D printer" and "additive processing device" are used herein interchangeably and generally refer to a device by which additive processing can be carried out. The terms "3D-printing" and "3D-printable" are used likewise and mean additive processing and suitable for additive processing.

Additive processing devices are devices by which sequential deposition of material in defined areas can be achieved, typically by deposition of volume elements, such as layers. Successive layers are built up, layer-on-layer to create a three-dimensional object.

Typically an additive processing device is computer-controlled and creates the desired object based on an electronic image of the object to be created. The 3D printer contains an energy source that applies energy to a localised area in a 3D-printable composition. The energy applied may be, for example, heat or irradiation or both. The energy source may include a light source, a laser, e-beam generators, generators and other sourcing capable of focussing energy to defined areas of the 3D-printable composition. The energy source may be moved to defined areas over the surface of the 3D printable composition, typically under computer control.

The additive printing device typically also contains a platform that can be moved into the 3D-printable composition or out of it, typically, by the distance of the layers to be formed on the platform. Typically this is also done under computer control. The device may further contain a device such as a wiper blade or an injection nozzle by which new printable material can be applied over the layer formed for successive layer-on-layer building. Support structures may be used and later removed in case the object to be created is complex or requires structural support during its creation.

Additive processing techniques are known. Objects can be created from liquid 3D printable compositions or solid 3D-printable compositions depending on the additive processing method and device used.

The 3D printable compositions provided herein contain fluoropolymers and one or more additional materials. Depending on the additive processing technique, upon exposure to the energy source of the additive processing device, the additional material either (i) melts or liquefies, or (ii) solidifies or polymerizes and binds fluoropolymer particles into a volume element or a layer. Such one or more additional materials are therefore also referred herein as "binder material".

In one embodiment of the present disclosure the layers are created from a solid composition. The 3D printable composition is typically provided in the form of particles, for example in the form of a powder, or in case of the filament deposition process, in the form of extruded filaments. The fluoropolymer and the binder material may be present as particles or the fluoropolymer particles may be coated with the binder material. The fluoropolymer particles are fused selectively by bringing the binder material to the melt (or liquefying it) using an energy source, typically a heat source. Depending on the melting temperature of the binder material a high or low heat source may be used. A laser may be used in case of selective layer sintering (SLS) or selective layer melting (SLM), or an electron beam in case of electron beam melting (EBM). If lower temperatures are sufficient for the formation of volume elements through melting or liquefying, heated wires and thermal print heads may be used (also referred to as "thermal printing"). Processes may include one or more thermal sources for inducing fusion between powder particles, a method for controlling powder fusion to a prescribed region of each layer, and a mechanisms for adding and smoothing powder layers. Fusion mechanisms can be based on solid-state sintering, chemically induced binding, liquid-phase sintering and full melting or combinations thereof.

These methods use an energy source to fuse particles into a mass that has a desired three-dimensional shape. The focused energy source selectively fuses powdered material by scanning cross-sections generated from a 3-D digital description of the part (for example from a CAD file or scan data) on the surface of a powder bed. After each cross-section is scanned, the powder bed is lowered (or raised depending on the design of the 3D printer) by one layer thickness, a new layer of material is applied on top, and the process is repeated until the part is complete. In selective laser sintering (SLS) or melting (SLM), typically a pulsed laser is used and in EBM an electron beam is used. In 3D thermal printing a heated wire or a thermal print head or other heat sources may be used. The heat may be generated for example, by electricity or irradiation or other appropriate means of generating increased temperatures. In the process of the present disclosure the binder material melts or liquefies or otherwise significantly reduces its viscosity upon exposure to the energy source thus binding the fluoropolymer particles into a volume element.

The processing device may preheat the bulk powder material in the powder bed somewhat below its melting point, to make it easier for the energy source to raise the temperature of the selected regions the rest of the way to the melting point.

Directed energy deposition (DED) processes deposit a material (usually a powder) and provide energy to process that material through a single deposition device. DED processes enable the creation of parts by melting material as it is being deposited, not by melting material that is pre-laid in a powder bed. As a focused heat source, a laser or electron beam may be used. If less energy is required to melt the material also another heat source, for example one or more thermal print heads may be used. In extrusion-layered deposition systems (e.g. fused filament fabrication systems and other melt-extrusion additive manufacturing processes) articles are produced layer-by-layer by extruding a the 3D-printable composition through an extrusion head. Movement of the extrusion head with respect to the substrate onto which the substrate is extruded is performed under computer control, in accordance with the build data that represents the article, for example a CAD file. The composition can be extruded through a nozzle carried by an extrusion head and deposited as a sequence of roads on a substrate in an x-y plane. The roads can be in the form of continuous beads or in the form of a series of droplets (e.g. as described, for example in US Patent Application No 2013/0081599). The extruded composition fuses to previously deposited composition as it solidifies upon a drop in temperature. This can provide at least a portion of the first layer of the three-dimensional article. By changing the position of the extrusion head relative to the first layer additional rows can be repeatedly build. This 3D-printing method is also known under the term "fused deposition modelling" or "FDM". The compositions provided herein may also be used in FDM, in which case they are formulated such that they can be extruded, for example as extrudable solid compositions or as extrudable pastes. The binder material typically melts during the extrusion process and the composition is deposited on selected locations where the molten binder material may solidify and thus binds the fluoroelastomer particles.

In another embodiment of the present disclosure the layers are formed by solidifying or polymerizing a binder material, typically from a liquid composition or an extrudable paste in controlled areas, for example through polymerization initiated by appropriate irradiation.

This type of additive manufacturing technique is generally referred to as stereolithography (SL) or vat polymerization (VP). Stereolithography is an additive manufacturing process that works by focusing electromagnetic irradiation (including, for example, irradiation with ultraviolet light (UV)) on to a vat of composition containing polymerizable material. With the help of computer aided manufacturing or computer aided design software (CAM/CAD), the irradiation is used to draw a pre-programmed design or shape on to the surface of the 3D-printable composition. Because the 3D-printable composition is reactive to the irradiation, the composition is solidified or gels and forms a single layer of the desired 3D object on the areas exposed to the irradiation. This process is repeated for each layer of the design under the 3D object is complete. Typically, the 3D printer used for stereolithography contains an elevator platform that descends a distance equal to the thickness of a single layer of the design (typically 0.05 mm to 0.15 mm) into the photopolymer vat. Then, a resin-filled blade may sweep across a cross section of the layer, re-coating it with fresh material. The subsequent layer is traced, joining the previous layer. A complete 3D object can be formed using this process.

Depending on the design of the additive processing device another typical method raises or lowers the build platform further than one layer or volume element so that the material is able to easily flow over the previous layer/volume element. Upon returning to the desired step height the previous layer is uniformly covered. The subsequent layer is traced joining the previous layer. A complete 3D object can be formed using this process.

Instead of irradiation with UV, irradiation with other wavelengths may be used, for example from the visible or invisible light (e.g. IR) and including X-rays and e-beams if a polymerizable material is chosen that is reactive to such irradiation or to polymerization initiators that are reactive to such irradiation. Conditions for effective irradiation may vary on the type of irradiation and the type of polymerizable materials chosen. Polymerizable materials and polymerization initiators may be selected that are responsive to various types of irradiation for example to irradiation with visible or invisible lights. For example irradiation with light of wave lengths from 10 to 1,000 nm may be used. The irradiation may be monochromatic or polychromatic depending on the reactivity of the polymerizable system chosen.

UV irradiation typically includes irradiation with a wave length between 10 and 410 nm. UV irradiation may be generated from a UV source, like a laser, a mercury lamp or UV LEDs. UV LEDs (light emitting diodes, LED) are commercially available that produce monochromatic irradiation at wave length of 365 nm, 385 nm and 405 nm within an error margin of +/−10 nm. Infrared irradiation typically includes irradiation with electromagnetic waves of a wave length from 1 mm to 750 nm. Irradiation with visible light typically includes irradiation with a wave length between 410 and 760 nm.

The printable composition comprises a binder material that is reactive to such irradiation with electromagnetic waves by polymerization (or reactive to polymerization initiators that are reactive to such irradiation). The printable compositions may thus contain one or more polymerizable binder material and, optionally, one or more polymerization initiators. The polymerization initiators used are activated by exposure to the irradiation from the energy source of the printing device and initiate polymerization of the binder material, which then increases its viscosity, gels or solidifies.

In a variant of this method the 3D-printable composition containing a polymerizable binder is applied as extrudable composition, typically a paste, through a nozzle at an extrusion head to a selected location. Polymerization is carried out as described above for the stereolithography process at the selected location but may already initiated or completed during the extrusion onto the selected location.

This method is referred to as "paste extrusion". The container containing the 3D printable composition may be heated to improve the surface quality of the extruded material.

Depending on the complexity of the article design supporting structures may be attached to the elevator platform to prevent deflection or delamination due to gravity and to hold cross sections in place in order to resist lateral pressure from the resin-filled blade.

The methods provided herein can be carried out in known and commercially available additive printing devices. Typical known methods and their 3D printer have been described, for example, in "Additive Processing of Polymers" by B. Wendel et al in *Macromol. Matter. Eng.* 2008, 293, 799-809. Examples of commercially available 3D printers include, but are not limited to 3D printers from ASIGA, Annaheim, Calif., USA for vat polymerization printing and from BLUEPRINTER, Copenhagen, Denmark for powdered bed printing with thermal heads. Printers for paste extrusions are commercially available from Hyrel 3D, Norcross, Ga. 30071, for example model Hyrel System 30M printer with a VOL-25 extruder head. Printers for filament extrusion (FDM) are available from Stratasys Direct Inc., Valencia, Calif. 91355, for example model Makerbot Replicator 2.

Fluoropolymers

The fluoropolymers for use in the present disclosure contain repeating units derived from fluorinated or perfluorinated monomers. Suitable fluoropolymers for use in the additive processing methods provided herein include curable fluoropolymers, i.e. fluoroelastomers. Fluoroelastomers are conveniently prepared by aqueous emulsion polymerization as known in the art. Alternatively, fluoroelastomers may be prepared by solvent polymerization including organic solvents and inorganic solvents like liquid $CO_2$ or by suspension polymerization. Suspension polymerization may be carried out in aqueous media without using emulsifiers. These methods are also known in the art of making fluoropolymers.

The fluoroelastomers are typically prepared by aqueous emulsion polymerization and are obtained as aqueous dispersions although methods have been described where the elastomers can be prepared without fluorinated emulsifiers. Typical emulsifiers include those that correspond to the formula wherein Q represents hydrogen, Cl or F, whereby Q may be present in a terminal position or not, Rf represents a linear or cyclic or branched perfluorinated or partially fluorinated alkylene having 4 to 15 carbon atoms, Z presents an acid anion, such as $COO^-$ or $SO_3^-$ and M represents a cation including an alkali metal anion or an ammonium ion. Examples fluorinated emulsifiers include those described in EP 1 059 342, EP 712 882, EP 752 432, EP 86 397, U.S. Pat. Nos. 6,025,307, 6,103,843, 6,126,849, 5,229,480, 5,763, 552; 5,688,884, 5,700,859, 5,895,799, WO00/22002 and WO0/71590. The fluorinated emulsifiers may be removed in the work up procedure, for example as described in WO03/051988.

Fluoroelastomers are curable fluoropolymers. They can be cured (cross-linked) into a three-dimensional network by reaction with curing agents. They typically contain at least 30% by weight of fluorine, more preferably at least 50% by weight of fluorine, most preferably at least 60% by weight of fluorine, and typically between 58 and 75% by weight of fluorine (based on the total weight of the polymer). The fluorine content may be achieved by selecting the co-monomers and their amounts accordingly. Typically, the curable fluoropolymers are amorphous. Generally, they have a glass transition temperature (Tg) of less than 25° C., preferably less than −105° C., and more preferably less than −20° and most preferably less than −35° C. The curable fluoropolymers described herein may typically have a Mooney viscosity (ML 1+10 at 121° C.) of from about 2 to about 150, preferably about 10 to about 100, more preferably from about 20 to about 70.

The fluoroelastomers may contain cure sites derived from cure site monomers. Typical cure site monomers include copolymerizable, preferably perfluorinated, co-monomers containing one or more iodine or bromine groups. Other cure sites include iodine or bromine end groups in terminal polymer positions. They can be created by using iodine or bromine containing chain transfer agents. Such groups cure upon reaction with a peroxide cure system. Examples of such fluoroelastomers are described, for example, in WO2012/018603 A1 or EP 1 097 948 B1. The fluoroelastomers may contain cure sites susceptible to bisphenol curing, or cure site groups susceptible to ammonium generating compounds, for example by formation of triazines. Such cure-sites typically include nitrile (—CN) groups. Examples of such curing agents and susceptible elastomers are described, for example, in WO 00/09603 A1. Examples of suitable fluoroelastomers include those described, for example, in WO2012/018603 A1 or EP 1 097 948 B1.

In one embodiment the fluoroelastomers are perfluoroelastomers, such as polymers of TFE and perfluorovinylethers that may contain optional oxygen atoms in the perfluoroalkyl chain (PAVE) and polymers of TFE, HFP and one or more PAVE. Typical examples of PAVEs include but are not limited to perfluoromethyl vinyl ether (PMVE), perfluoropropyl vinyl ethers (PPVEs) and alkoxy vinyl ethers including those of the general formula:

where $R_{f1}$ and $R_{f2}$ are different linear or branched perfluoroalkylene groups of 2-6 carbon atoms, m and n are independently 0-10, and Rf is a perfluoroalkyl group of 1-6 carbon atoms. Another class of perfluoro(alkyl vinyl) ethers includes compositions of the formula

where X is F or $CF_3$, n is 0-5, and Rf is a perfluoroalkyl group of 1-6 carbon atoms. Another class of perfluoro (alkyl vinyl) ethers includes those ethers wherein n is 0 or 1 and Rf contains 1-3 carbon atoms. Additional perfluoro (alkyl vinyl) ether monomers include compounds of the formula

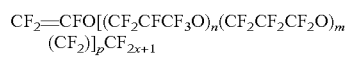

where m and n independently are 1-10, p represents 0-3, and x represents 1-5. Other examples include those of the formula $CF_2$=$CFOCF_2OR$, wherein R is a $C_2$-$C_6$ linear or branched or cyclic perfluoroalkyl groups that may optionally contain one or more catenary oxygen atoms as described, for example, in EP 1 148 072. Also the allyl analogues may be used, i.e. polymers with $CF_2$=$CFCF_2$—O— unit instead of the vinyl unit $CF_2$=$CF$—O—.

Particular examples of perfluorovinyl ethers include:

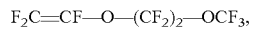

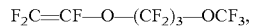

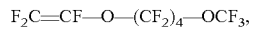

$F_2C=CF-O-CF_2-(OCF_2)_3-CF_3$, $F_2C=CF-O-CF_2-(OCF_2)_4-CF_3$, $F_2C=CF-O-(CF_2O)_2-OCF_3$, $F_2C=CF-O-(CF_2O)_3-OCF_3$, $F_2C=CF-O-(CF_2O)_4-OCF_3$.

Specific examples of suitable perfluorinated allyl ether comonomers include:

$F_2=CF-CF_2-O-CF_3$ $F_2C=CF-CF_2-O-C_2F_5$ $F_2C=CF-CF_2-O-C_3F_7$ $F_2C=CF-CF_2-O-CF_2-O-(CF_2)-F$, $F_2C=CF-CF_2-O-CF_2-O-(CF_2)_2-F$, $F_2C=CF-CF_2-O-CF_2-O-(CF_2)_3-F$, $F_2C=CF-CF_2-O-CF_2-O-(CF_2)_4-F$, $F_2C=CF-CF_2-O-(CF_2)_2-OCF_3$, $F_2C=CF-CF_2-O-(CF_2)_3-OCF_3$, $F_2C=CF-CF_2-O-(CF_2)_4-OCF_3$, $F_2C=CF-CF_2-O-(CF_2)_3-(OCF_2)_2-F$, $F_2C=CF-CF_2-O-CF_2-(OCF_2)_3-CF_3$.

$F_2C=CF-CF_2-O-CF_2-(OCF_2)_4-CF_3$.

$F_2C=CF-CF_2-O-(CF_2O)_2-OCF_3$, $F_2C=CF-CF_2-O-(CF_2O)_3-OCF_3$.

$F_2C=CF-CF_2-O-(CF_2O)_4-OCF_3$.

Particular examples of perfluorinated alkyl allyl ether (PAAE's) include unsaturated ethers according to the general formula:

$CF_2=CF-CF_2-OR^f$ wherein $R^f$ represents a linear or branched, cyclic or acyclic perfluorinated alkyl residue. $R^f$ may contain up to 10 carbon atoms, e.g. 1, 2, 3, 4, 5, 6, 7, 8, 9 or 10 carbon atoms. Preferably $R^f$ contains up to 8, more preferably up to 6 carbon atoms and most preferably 3 or 4 carbon atoms. $R^f$ may be linear, branched and it may contain or not contain a cyclic unit. Specific examples of $R^f$ include perfluoromethyl ($CF_3$), perfluoroethyl ($C_2F_5$), perfluoropropyl ($C_3F_7$) and perfluorobutyl ($C_4F_9$), preferably $C_2F_5$, $C_3F_7$ or $C_4F_9$. In a particular embodiment $R^f$ is linear and is selected from $C_3F_7$ or $C_4F_9$.

Perfluorinated alkyl allyl ethers and alkyl vinyl ethers as described above are either commercially available, for example from Anles Ltd. St. Peterburg, Russia or can be prepared according to methods described in U.S. Pat. No. 4,349,650 (Krespan) or international patent application no. WO 01/46107 (Worm et al) or in Modern Fluoropolymers, J. Scheirs, Wiley 1997 and the references cited therein or by modifications thereof as known to the skilled person.

Mixtures of perfluoro (alkyl vinyl) ethers and perfluoro (alkoxy vinyl) ethers may also be used, as well as mixtures of the vinyl and allyl ethers described above.

In one embodiment perfluoroelastomers are composed of tetrafluoroethylene and at least one perfluoro (alkyl vinyl) ether as principal monomer units. In such copolymers, the copolymerized perfluorinated ether units may constitute from about 15-60 mole percent of total monomer.

In general, the amounts of comonomers are selected to give a polymer with a Tg of less than 25° C., and, preferably a fully amorphous polymer as is known in the art.

Preferably, the perfluoroelastomers contain CN-cure sites, for example by CN-group bearing co-monomers (cure site monomers). In one embodiment the perfluoroelastomer contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$CF_2=CF-O-(CF_2)_n-CN$ where $n=2$-12, preferably 2-6;

$CF_2=CF-O-[CF_2-CFCF_3-O]_n-CF_2-CF(CF_3)-CN$; where $n=0$-4, preferably 0-2;

$CF_2=CF-[OCF_2CF(CF_3)]_x-O-(CF_2)_n-CN$; where $x=1$-2, and $n=1$-4; and $CF_2=CF-O-(CF_2)_n-O-CF(CF_3)CN$ where $n=2$-4.

The 3D-printable compositions may contain curatives for curing the fluoroelastomer. Suitable curatives for elastomers with nitrile-cure sites include, but are not limited to, nitrogen containing substances that decompose to generate ammonia, preferably at high temperatures and as known in the art. Suitable compounds include hexamethylene tetramine, amidoximes, amidrazones, carboxamides, phthalimides, amidines and combinations therefore. Also ammonium salts of organic acids may be used.

The curatives may be selected for the 3D printing method used. Typically, the article is created in the 3D printer without activating the curing reaction, i.e. without activating the curative. Curing agents that become reactive upon thermal treatment are suitable for methods using polymerizable binders that are activated by UV curing.

For 3D printing methods using a binder material that melts or liquefies curative are used that get activated at greater temperatures than the temperature applied to melt or liquefy the binder material. Curing of the article is typically carried out after the article has been formed, for example when removing the binder material or dispersing media, like water, in case the 3D-printable compositions are used as dispersions.

Amount and type of curatives can be optimized, depending on binder, polymers and energy source. Amounts of curatives and type of curative will influence the curing speed and properties and can be optimized upon demand.
Commercially Available Fluoroelastomer and Curing Agents May be Used.
Preparation of Fluoropolymer Articles For preparing a fluoropolymer article, the fluoropolymer is provided as a 3D printable composition. The compositions are subjected to additive processing in an additive processing device. Various types of additive processing and additive processing devices may be used. The 3D-printable compositions may be optimized for different types of 3D printers and 3D-printing methods.

Additive Processing Using a Polymerizable Binder Material.

In this embodiment the article is formed by using a binder material that increases its viscosity upon exposure to the energy source of the additive processing device. This can be achieved by using a polymerizable binder, which polymerizes upon exposure to the energy source. It may either create a solid or it may gel or it simply increases in viscosity. The binder is present in an effective amount to bind the fluoropolymer particles when polymerized. This keeps the particles in the selected location to create a volume element.

In one embodiment the fluoropolymer is provided in a composition comprising one or more binder materials that are polymerizable. The composition may further comprise one or more polymerization initiator. The polymerization initiator may be activated by exposure to the energy source and causes the polymerizable material to polymerize. Alternatively (or in addition), the end groups of the polymerizable binder material may be reactive enough that no polymerization initiator other than the energy source of the additive processing device is needed to initiate the polymerization. The 3D printable composition may be a solution but preferably is a dispersion containing fluoropolymer particles. The particles may be dispersed in an inert organic medium. Preferably the fluoropolymer particles are dispersed in an aqueous medium and the 3D printable composition comprises an aqueous dispersion of fluoropolymer particles. The fluoropolymer content of the compositions is preferably as high as possible but may be limited by stability of the dispersion (coagulation or precipitation of fluoropolymers) or the dispersions may convert into pastes and polymerization might proceed too slowly to create solidified layers by vat polymerization. Pastes, however, may be preferred in other methods, for example in the paste extrusion methods. Generally, concentrations of fluoropolymers may include but are not limited to concentrations from about 20 to 70% wt. based on the total weight of the composition, or from 25 to 60%, from about 30 to 50% or from about 31 to 45% wt. based on the total weight of the composition.

The polymerizable binder material is matched to the energy source or to the polymerization initiator, which is matched to the energy source of the additive processing device (3D printer), such that exposure of the 3D printable composition to the energy source allows polymerization to proceed and at appropriate speed in the part of the composition that has been exposed to the energy source of the 3D printer.

The polymerizable binder material may be dissolved or dispersed in the 3D printable composition, or it may be a liquid and may be used as dispersing medium for the fluoropolymer particles: Preferably the polymerizable binder material is dissolved in the 3D-printable composition. To dissolve or disperse the binder material organic solvents or dispersants may be used or an aqueous medium like water may be used. The organic solvents or dispersants are preferably inert and do not polymerize or react with the binder or polymerization initiator.

The optimum amount and type of polymerizable binder material may be determined taking into account the following: the amount of binder material preferably is high enough such that it allows to solidify in the areas where the layers are to be created, i.e. it is preferably present in an effective amount to allow the formation of solidified layers of the desired dimensions. Secondly, the amount of polymerized binder may be minimised with respect to the fluoropolymer content to minimise or avoid shrinking of the article during the working up process. Also the formation of voids in the finished articles created during the removal of the polymerized binder material may be minimised or even avoided. Also the stability of the fluoropolymer dispersion has to be considered and too high amounts of binder material may lead to premature coagulation of the fluoropolymer dispersion or solution. The binder material is capable to polymerize to form a solid or gel of sufficient strength to retain dimensional stability throughout the creation of the created object. However, the polymerized binder material is not responsible for the dimensional stability of the finished article and can be removed thermally during the work up procedure without the article becoming dimensionally unstable. The polymerizable binder material desirably polymerizes fast under the conditions in the additive processing machine.

Preferably, the polymerized binder thermally degrades at temperatures below the decomposition of the elastomer or structural failure. Preferably, the binder can be combusted at such conditions. The polymerization should be controlled to the areas exposed to the energy source of the 3D printer. If necessary and depending on the energy source used, polymerization inhibitors may be added that help preventing the polymerization from proceeding outside the parts of the compositions that were exposed to the energy source.

A suitable polymerizable binder material includes monomers, oligomers or polymers with polymerizable groups, preferably end groups. Such polymerizable end groups include groups reactive to electromagnetic irradiation by polymerization or that polymerize upon activation by polymerization initiators or a combination thereof. Suitable polymerization initiators include those that are activated by electromagnetic irradiation and include organic or inorganic initiators.

Suitable polymerizable binder materials include compounds with polymerizable groups comprising one or more olefinic unsaturation. Examples include compounds with end or side groups comprising one or more ethylenic unit, i.e. a carbon-carbon unsaturation (e.g., a carbon-carbon double bond). Examples include end groups comprising one or more of the groups selected from vinyl groups (e.g., $H_2C=CX-$ groups), allyl groups (e.g., $H_2C=CX^2-CX^3X^4-$), vinyl ether groups (e.g., $H_2C=CX-O-$), allyl ether groups e.g., ($H_2C=CX^2-CX^3X^4-O-$), and acrylate groups (e.g., $H_2C=CX-CO_2-$) and combinations thereof. $X^2$ represents H, methyl, halogen (F, Cl, Br, I) or nitrile and $X^3$ and $X^4$ each independently represents H, methyl, halogen (F, Cl, Br, I) or nitrile. In one embodiment one of $X^3$ or $X^4$ is methyl and one is H and also $X^2$ is H. In a preferred embodiment $X^2$, $X^3$ and $X^4$ are all H. X represents H or $CH_3$.

Suitable polymerizable groups include but are not limited to end and side groups comprising one or more units corresponding to the general formula (I)-(IV):

$$H_2C=C(X)- \tag{I}$$

$$H_2C=C(X)-O- \tag{II}$$

$$H_2C=C(X)-CH_2-O- \tag{III}$$

$$H2C=C(X)-C(=O)- \text{ or } H_2C=CX-CO_2-$$

$$H_2C=C(X)-OC(O)- \tag{IV},$$

wherein X represents a hydrogen or methyl group.

Examples of polymerizable binder materials include mono acrylates and mono methacrylates, i.e. compounds with one end or side group comprising an acrylate group or methacrylate group (e.g. an $H_2C=CX-CO_2-$ group where X is H or $CH_3$) and poly acrylates or poly methyl acrylates, i.e. compounds having more than one end and/or side groups comprising an acrylate or methacrylate group. Examples include monomeric, oligomeric and polymeric acrylates (i.e. comprising one repeating monomer unit, in case of monomeric compounds, from more than 1 up 25 repeating monomeric units in case of oligomeric compounds and from more than 25 repeating units in case of polymeric compounds. Further, these compounds comprises at least one acrylate end or side group to qualify as acrylates. Examples for repeating units include but are not limited to ethoxy ($-CH_2CH_2-O-$) units and propoxy ($-C_3H_6O-$) units and acrylate units and combinations thereof. Acrylates comprising an ethoxy unit are referred to also as "ethoxylated acrylates". Specific examples include ethoxylated or polyethoxylated acrylates, for example compounds having one, two or three acrylic end or side groups. Other examples include acrylates having one or more than one acrylate group linked to an alkyl or alkylene chain that may be interrupted once or more than once by oxygen atoms. Acrylates include but are not limited to monoacrylates, diacrylates and triacrylates and combinations thereof including their methacrylic equivalents. Specific examples include but are not limited to ethoxylated triacrylates and diacrylates and the corresponding methacrylates. Specific examples include ethoxylated trimethylol propane triacrylates; (SR415); polyethylene glycol dimethacrylate (SR252), ethoxylated bisphenyl A dimethacrylate (SR9036A), ethoxylated bisphenyl A dimethacrylate (SR9038) all commercially available from Sartomer Americas, Exton, Pa., USA.

In one embodiment of the present disclosure the binder material comprises a polyethylene glycol di- or triacrylate or a combination of polyethylene glycol di- and triacrylates.

The overall composition of the polymerizable material may be selected so that the polymerizable material is liquid, or is soluble in a solvent or dispersing medium used in the 3D-printable composition, e.g. water. Further, the overall composition of the polymerizable material can be selected to adjust compatibility with the other ingredients of the 3D-printable composition or to adjust the strength, flexibility, and uniformity of the polymerized material. Still further, the overall composition of the polymerizable material can be selected to adjust the burnout characteristics of the polymerized material prior to sintering. Various combinations of binder materials may be possible and are available to the person skilled in the art. Mixtures of different polymerizable binder materials may be used. For example bi- or polyfunctional polymerizable binder materials may be included that generate a cross-linked network. A successful build typically requires a certain level of green body gel strength as well as shape resolution. A crosslinked approach often times allows for greater green body gel strength to be realized at a lower energy dose since the polymerization creates a stronger network. The presence of monomers having a plurality of polymerizable groups tends to enhance the strength of the gel composition formed when the printing sol is polymerized. The amount of the monomer with a plurality of the polymerizable groups can be used to adjust the flexibility and the strength of the green body, and indirectly optimize the green body resolution and final article resolution.

In the following, exemplary binder materials are contemplated as being useful as an alternative to the materials described above or in combination with them.

Examples include but are not limited to acrylic acid, methacrylic acid, beta-carboxyethyl acrylate, and mono-2-(methacryloxyethyl)succinate. Exemplary polymerization hydroxyl-containing monomers for use as binder or for preparing binder compositions include hydroxyethyl acrylate, hydroxyethyl methacrylate, hydroxypropyl acrylate, hydroxypropyl methacrylate, hydroxyl butyl acrylate, and hydroxybutyl methacrylate. Acryloxy and methacryloxy functional polyethylene oxide, and polypropylene oxide may also be used as the polymerizable hydroxyl-containing monomers.

An exemplary radically polymerizable binder material comprises mono-(methacryloxypolyethyleneglycol) succinate.

Another example of a radically polymerizable binder material (activated by a photoinitiator) is a polymerizable silane. Exemplary polymerizable silanes include methacryloxyalkyltrialkoxysilanes, or acryloxyalkyltrialkoxysilanes (e.g., 3-methacryloxypropyltrimethoxysilane, 3-acryloxypropyltrimethoxy-silane, and 3-(methacryloxy)propyltriethoxysilane; as 3-(methacryloxy)propylmethyldimethoxysilane, and 3-(acryloxypropyl)methyldimethoxysilane); methacryloxyalkyldialkylalkoxysilanes or acyrloxyalkyldialkylalkoxysilanes (e.g., 3-(methacryloxy)propyldimethylethoxysilane); mercaptoalkyltrialkoxylsilanes (e.g., 3-mercaptopropyltrimethoxysilane); aryltrialkoxysilanes (e.g., styrylethyltrimethoxysilane); vinylsilanes (e.g., vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, and vinyltris(2-methoxyethoxy)silane).

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary monomers with three or four (meth)acryloyl groups include, but are not limited to, trimethylolpropane triacrylate (e.g., commercially available under the trade designation TMPTA-N from Cytec Industries. Inc. (Smyrna, Ga., USA) and under the trade designation SR-351 from Sartomer (Exton, Pa., USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaerythritol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries. Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer).

Exemplary monomers for use as polymerizable binders include alkyl (meth)acrylates that have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, 3,3,5-trimethylcyclohexyl (meth)acrylate, n-decyl (meth)acrylate, isodecyl (meth)acrylate, isobornyl (meth)acrylate, 2-propylheptyl (meth)acrylate, isotridecyl (moth)acrylate, isostearyl (meth)acylate, octadecyl (meth)acrylate, 2-octyldecyl (meth)acrylate, dodecyl (meth)acrylate, lauryl (meth)acrylate, and heptadecanyl (meth)acrylate.

Optimum amounts of binder material may be adapted to the specific system used. Generally, suitable amounts of polymerizable binder are from 1 to 50%, or from 2 to 25%, or from 10 to 20% (weight per cents based on the total weight of the compositions). The polymerized binder may have to be removed during the work-up procedure so the binder material should not be used in a great excess over the fluoropolymer particles as this may cause a structural failure of the article. Optimum ratios of fluoropolymer to polymerizable binder material depend on the type and nature of the binder material but may typically include, but are not limited to, weight ratios of fluoropolymer to polymerizable binder material of from 5:1 to 1:2, preferably from 4:1 to 1:1.

In some applications, it can be advantageous to minimize the weight ratio of polymerizable binder material to fluoropolymer particles in the reaction mixture. This tends to reduce the amount of decomposition products of organic material that needs to be burned out prior to formation of the sintered article. The amount of binder may also depend on the speed at which the fluoropolymer particles sinter. If the sintering proceeds fast the combustion gases from the binder material get trapped inside the article, which can lead to a reduced density and/or to surface defects. In this case oxidation catalysts may be used or the amount binder may be reduced.

Preferably, the binder material comprises polymerizable monomers or oligomers having a molecular weight from 100 to 5,000 g/mole. This may facilitate the formation of a 3D-printable composition of a favourably low viscosity. In one embodiment the polymerizable binder material is a liquid.

Other exemplary polymerizable binder materials contemplated herein include but are not limited to epoxides and reactive components that can polymerize to form polyurethanes.

The binder material is preferably selected such that the resulting polymer easily degrades at the temperatures applied to work up the article.

Other Additives:
Polymerization Initiators

One or more polymerization initiators that initiate polymerization of the polymerizable binder material may be present in the 3D-printable composition. The polymerization initiator gets activated upon exposure to the energy source, for example, upon exposure to UV irradiation or e-beam irradiation, or heat. Initiators that are activated by irradiation with visible or invisible light are referred to as photoinitiators. Polymerization initiators may be organic or inorganic. Polymerization Initiators are known in the art and are commercially available. Preferably, the following classes of photoinitiator(s) can be used: a) two-component system where a radical is generated through abstraction of a hydrogen atom form a donor compound; b) one component system where two radicals are generated by cleavage.

Examples of photoinitiators according to type (a) typically contain a moiety selected from benzophenone, xanthone or quinone in combination with an aliphatic amine.

Examples of photoinitiators according to type (b) typically contain a moiety selected form benzoin ether, acetophenon, benzoyl oxime or acyl phosphine.

Exemplary UV initiators include 1-hydroxycyclohexyl benzophenone (available, for example, under the trade designation "IRGACURE 184" from Ciba Specialty Chemicals Corp., Tarrytown, N.Y.), 4-(2-hydroxyethoxy)phenyl-(2-hydroxy-2-propyl) ketone (available, for example, under the trade designation "IRGACURE 2529" from Ciba Specialty Chemicals Corp.), 2-hydroxy-2-methylpropiophenone (available, for example, under the trade designation "DAROCURE D111" from Ciba Specialty Chemicals Corp, and bis(2,4,6-trimethylbenzoyl)-phenylposphineoxide (available, for example, under the trade designation "IRGACURE 819" from Ciba Specialty Chemicals Corp.).

In one embodiment of the present disclosure a polymerization initiator is used with a polymerizable binder material selected from acrylates. Typically the polymerization initiator is a photoinitiator, which is activated by irradiation with visible or invisible light, preferably by UV irradiation. The optimum amounts of initiator depend on the system used. Typical amounts include but are not limited to amounts of 1 to 0.005 or from 0.1 to 0.0001 times the weight of the polymerizable binder used.

The photoinitiator should be able to start or initiate the polymerization of the polymerizable binder material. Typical amounts of photoinitiator(s) include but are not limited to the following amounts: Lower amount: at least 0.01 or at least 0.1 or at least 0.5 wt.-%; Upper amount: at most 0.5 or at most 1.5 or at most 3 wt.-%; Range: from 0.01 to 3 or from 0.5 to 1.5 wt.-%; wt.-% with respect to the weight of the 3D-printable composition. Other amounts may include, for example, from at least 0.001, or at least 0.01 or at least 0.05 wt.-%; Upper amount: at most 0.5 or at most 1.5 or at most 3 wt.-%; Range: from 0.001 to 3 or from 0.05 to 1.5 wt.-%; wt.-% with respect to the weight of the 3D-printable composition.

Instead of polymerization initiators that are activated by visible or invisible light, like UV irradiation, it is also possible to use initiators that are activated thermally or by actinic irradiation. In such case, the energy source of the additive manufacturing device is appropriately selected to allow activation of the initiators.

Polymerization Inhibitors

The 3D-printable compositions may also contain one or more polymerization inhibitors, to help keep the polymerization reaction localized to the areas that have been exposed to the energy source of the additive processing machine. Such polymerization inhibitors slow down the polymerization reaction or terminate it, for example by acting as radical scavengers. Inhibitors for polymerization with irradiation through light, including UV light are known in the art as "photoinhibitors" and include commercially available materials such as 2,6-di-tert-butyl-4-methylphenol, available from Sigma-Aldrich, St Louis, Mo., USA. Optimum amounts of inhibitors depend on the system of polymerizable binder material, initiators and energy source used. Typical amounts of inhibitors include but are not limited to amounts of from 0.9 to 0.001 times the amount of polymerization initiator (by weight).

Fillers, Pigments, UV Enhancers and Oxidation Catalysts

The 3D-printable compositions may further comprise fillers, pigments or dyes if compatible with the 3D printer used and the thermal work up treatment. Fillers may include but are not limited to silicon carbide, boron nitride, molybdenum sulfide, aluminum oxides, carbon particles, such as graphite or carbon black, carbon fibers, carbon nanotubes. The filler content can be optimized to the system used and may typically be between 0.01 to 10% or up to 30% or even up to 50% by weight based on the total weight of the composition depending on the fluoropolymer and binder materials used. The fillers should be in particulate form and have sufficiently small particle size to allow for a homogeneous dispersion in the 3D-printable composition. To be compatible with the 3D-printable composition the filler particles advantageously have a particle size of less than 500 µm, preferably less than 50 µm or even less than 5 µm.

Pigments have to be heat-stable at the temperatures applied in the thermal work up procedures, i.e. at least the melting temperature of the non-melt processable fluoropolymer.

Ingredients that increase the irradiation energy from the energy may also be included in the 3D printable composition. For example, by activation through UV irradiation UV enhancers ("optical brighteners") may be included in the composition. These are chemical compounds that absorb light in the ultraviolet and violet region (usually 340-370 nm) of the electromagnetic spectrum, and re-emit light in the blue region (typically 420-470 nm) by fluorescence A useful optical brightener is Benetex OB-M1. Lakefield ct. Suwanee, Ga. 30024. This UV brighteners may also help to limit the penetration of the irradiation from the energy source through the 3D-printable composition and to control the polymerization to localized areas.

Oxidation catalysts may also be included in the 3D-printable composition to accelerate the combustion of binder during the thermal work up procedure. This may help to create a smoother surface and to avoid the formation of surface defects and/or internal voids. It is believed that when the combustion of the binder material is not completed when the surface particles fuse during a sintering step trapped combustion gases may lead to formation of microbubbles or micro cracks on the surface and/or interior of the sintered article. The oxidation catalyst may accelerate the combustion such that the combustion gases have evaporated before the fluoropolymer particles on the surface fuse. Oxidation catalysts are described for example in U.S. Pat. No. 4,120,608 and include cerium oxides or other metal oxides. Cerium oxide is commercially available from Nyacol Nano Technologies Inc. This also might reduce scattering effects from the UV source.

Optimum amounts of binder material have to be adapted the specific system used. Generally, suitable amounts of polymerizable binder are from 1 to 25%, or from 10 to 20% (weight per cents based on the total weight of the compositions).

One or more polymerization initiators may be present in the composition that initiate polymerization of the polymerizable binder material. The polymerization initiator gets activated upon exposure to the energy source, for example upon exposure to UV irradiation or e-beam irradiation. Initiators that are activated by irradiation with visible or invisible light are referred to as photoinitiators. Polymerization initiators may be organic or inorganic. Polymerization initiators are known in the art and are commercially available. Typically such compounds include organic and inorganic peroxides, peroxosulfates and peroxosulfonates. Commercially available photoinitiators in particular suitable for use with acrylates include those available under the trade designation IRGACURE, for example bis-(2,4,6-trimethyl-benzoyl phenylphosphine oxide) available as IRGACURE 819DW from BASF, Charlotte, N.C., USA). In one embodiment of the present disclosure a polymerization initiator is used with a polymerizable binder material selected from acrylates. Typically the polymerization initiator is as a photoinitiator, which is activated by irradiation with visible or invisible light, preferably by UV irradiation. The optimum amounts of initiator depend on the system used. Typical amounts include but are not limited to amounts of 1 to 0.005 times the weight of the polymerizable binder used.

The compositions may also contain polymerization inhibitors, to help localizing the polymerization to the areas exposed to the energy source of the additive processing machine. Such polymerization inhibitors slow down the polymerization reaction or terminate it, for example by acting as radical scavengers. Inhibitors for polymerization with irradiation through light, including UV light are known in the art as "photoinhibitors" and include commercially available materials such as 2,6-di-tert-butyl-4-methylphenol, available from Sigma-Aldrich, St Louis, Mo., USA. Optimum amounts of inhibitors depend on the system of polymerizable binder material, initiators and energy source used. Typical amounts of inhibitors include but are not limited to amounts of from 0.9 to 0.001 times the amount of polymerization initiator (by weight).

The compositions may further comprise fillers, pigments or dyes if compatible with the 3D printer used. Fillers may include but are not limited to silicon carbide, boron nitride, molybdenum sulfide, aluminum oxides, and carbon particles such as graphite or carbon black, carbon fibers, carbon nanotubes. The filler content can be optimized to the system used and may typically be between 0.01 to 10% or up to 30% weight based on the total weight of the composition depending on the fluoropolymer and binder materials used.

Ingredients that increase the irradiation energy from the energy may also be included in the 3D printable composition. For example, by activation through UV irradiation UV enhancers may be included in the composition.

Other Optional Additives Include, but are not Limited to Viscosity Modifiers.

The fluoropolymer used in the compositions is preferably present in the form of dispersed particles, for example as a dispersion. Typical particle sizes of the fluoropolymer particles include from 50 to 500 nm, or from 70 to 350 nm (average particle size, $D_{50}$ determined as Z-average). In one embodiment, the compositions are aqueous dispersions. The amount of water can be adjusted to modify the consistency of the composition. However, it is also contemplated that water can be replaced by the polymerizable binder material. In one embodiment, the compositions are pastes, for example compositions containing less than 10% by weight of water or even less than 5% by weight of water. Such pastes are suitable from the paste extrusion process.

The 3D-printable compositions may additionally contain one or more curative which cures the fluoroelastomer. The initiator, polymerizable binder material and curative for the elastomer are chosen such that the curative is substantially not activated when the polymerization initiator is initiated.

Substantially not activated means the curing reaction initiated and/or controlled by the curing reaction does not proceed at all or only to an insignificant extent, for example, because the curing reaction proceeds much slower than the polymerization of the binder material. The curative is then activated after the object has been created, for example before the polymerized binder material has been removed or during the removal of the polymerized binder material, or after the removal of the binder material. The binder material and curing agents are chosen such that they are activated at different conditions.

In one embodiment a blend of two or more fluoropolymers is used. Such blends include a blend of two or more fluoropolymers of the same type, for example a blend to two or more fluoroelastomers or a blend of elastomers and non-elastomeric fluoropolymers. The fluoropolymers may differ in their chemical composition, by their particle sizes or by combinations thereof. Also blends of fluorothermoplastics and fluoroelastomers may be used.

In one embodiment, a 3D printable composition suitable for vat polymerization or stereolithography comprises:
from 20-70% wt of one or more fluoroelastomers;
from 1 to 50%, or from 2 to 25% or from 10 to 20% of polymerizable binder
0 to 10% of curing agents for curing the fluoroelastomer,
0 to 30% by weight of filler,
0 to 10% of other additives,
and from 10 to 80% of water. (All percentages are percent by weight and are based on the total amount of the composition which is 100% by weight).

Water is used in amounts to provide a stable dispersion and the desired viscosity for the printing method. In case of vat polymerization the compositions are desirably of low viscosity, in other processes a higher viscosity may be desired and no water may be necessary at all. Dispersions or solutions are preferred for 3D printing methods like vat-polymerization.

In another embodiment a 3D-printable composition suitable for use in paste extrusion methods comprises
from 20-70% wt of one or more fluoroelastomers;
from 1 to 50%, or from 2 to 25% or from 10 to 20% of polymerizable binder
0 to 10% of curing agents for curing the fluoroelastomer,
0 to 30% by weight of filler,
0 to 10% of other additives,
and from 0 to 80% of water. (All percentages are percent by weight and are based on the total amount of the composition which is 100% by weight).

For creating an article the 3D-printable composition is entered into the additive processing machine (3D printer), for example those described for stereolithography or paste extrusion and subjected to additive processing to create a three-dimensional object. The resulting object, also referred to as "green body," may be obtained in the form of an hydrogel and may be subjected to drying. It may be removed from the 3D printer for that purpose and is separated from the unreacted composition. The unreacted composition may be discarded or reused. Drying to remove solvent or dispersion medium if present is preferably carried out in a way that avoids the formation of cracks or tilts in the object. Drying should be carried out in a manner that the entirety of the green body dries as uniform as possible to avoid the formation of cracks or tilts in the object. This can be done in a multitude of ways. For example, but not limited thereto, the drying can be carried out at room temperature for 12 or 24 hours. In cases where the exterior of the article dries quicker than the interior quick uniform drying in a vacuum oven may be preferred, for example but not limited to drying at 760 to $1 \times 10^{-3}$ Torr at a temperature between 40-70° C. In case of larger articles where there is a lot of water present, drying in a humid environment of 50 to 90% humidity over the course of at least 48 hours may be preferred.

The polymerized binder material may be removed from the green body, preferably in a separate heating regime. Conveniently this is carried out by heat treatment to degrade (for example by oxidization or combustion) and/or evaporate the polymerized material. The temperatures are chosen such that the fluoropolymer article does not melt or gets destroyed. The resulting object may then be subjected to another heat treatment at higher temperatures. The temperatures are chosen such that the fluoropolymer article does not melt or gets destroyed.

The final article typically has the same shape as the green body, although some shrinking compared to the green body may be observed. By doing control runs the shrinking can be taken into account when programming the additive processing machine. Shrinking can be minimised by maximizing the fluoropolymer content of the 3D printable composition.

The article may be subjected to curing. Curing may be carried out prior, after or during the removal of the liquid phase, or the removal or degradation of the binder material.

Additive Processing by Melting or Liquefying a Binder Material

In another embodiment the fluoropolymer article can be created by subjecting defined areas of a 3D printable fluoropolymer compositions containing a binder that melts or liquefies upon exposure to the energy source of the additive processing device to melting or liquefying. In this embodiment the fluoropolymer typically is provided as a solid composition in form of granules or as a powder or as extruded filaments comprising the binder material and other additives. The 3D printable composition here comprises at least one binder material that reduces its viscosity upon exposure to the energy source of the additive processing device, for example it melts or liquefies upon exposure to the energy source of the additive processing machine, which may be a laser, for example a laser of a selective laser melting machine, or if lower temperatures can be used the thermal print head of a thermal printer, or the heated extrusion head in case of filament deposition printing. Suitable binder materials include organic materials, preferably polymers that have melting points above room temperature, preferably above 40° C. (but below the degradation temperature of the fluoroelastomers). However, polymers that in a strict scientific sense do not melt but soften or become less viscous may also be used. Typically, the meltable binder has a melting point or melting range within a temperature from about 40 to about 140° C. Organic materials are materials that have carbon-carbon and carbon-hydrogen bonds and the materials may optionally be fluorinated, i.e. one or more hydrogens may be replaced by fluorine atoms. Suitable materials include hydrocarbon or hydrocarbon mixtures and long chain hydrocarbon esters, hydrocarbon alcohols and combinations thereof and including their fluorinated derivatives. An examples of suitable material includes waxes, sugars, dextrins, thermoplastics having a melting point as described above, polymerized or cross-linked acrylates, methacrylates, and combinations thereof. The waxes may be natural waxes or synthetic waxes. Waxes are organic compounds containing long alkyl chains, for example long chain hydrocarbons, esters of carboxylic acids and long chain alcohols and esters of long chain fatty acids and alcohols, sterols and mixtures and combinations thereof. Waxes also include mixtures of long chain hydrocarbons. The term "long chain" as used herein means a minimum number of 12 carbon atoms.

Natural waxes include beeswax. A major component of the beeswax is myricyl palmitate which is an ester of triacontanol and palmitic acid. Spermaceti occurs in large amounts in the head oil of the sperm whale. One of its main constituents is cetyl palmitate. Lanolin is a wax obtained from wool, consisting of esters of sterols. Carnauba wax is a hard wax containing myricyl Cerotate.

Synthetic waxes include paraffin waxes. These are hydrocarbons, mixtures of alkanes usually in a homologous series of chain lengths. They may include saturated n- and iso-alkanes, naphthylenes, and alkyl- and naphthylene-substituted aromatic compounds. Also fluorinated waxes may be used in which case some hydrogen atoms are replaced by fluorine atoms.

Other suitable waxes can be obtained by cracking polyethylene or propylene ("polyethylene wax" or "polypropylene wax"). The products have the formula $(CH_2)_nH_2$, where n ranges between about 50 and 100. Other examples of suitable waxes include but are not limited to candelilla wax, oxidized Fischer-Tropsch wax, microcrystalline wax, lanolin, bayberry wax, palm kernel wax, mutton tallow wax, petroleum derived waxes, montan wax derivatives, oxidized polyethylene wax, and combinations thereof.

Suitable sugars include for example and without limitation, lactose, trehalose, glucose, sucrose, levulose, dextrose, and combinations thereof.

Suitable dextrins include for example and without limitation, gamma-cyclodextrin, alpha-cyclodextrin, beta-cyclodextrin, glucosyl-alpha-cyclodextrin, maltosyl-alpha-cyclodextrin, glucosyl-beta-cyclodextrin, maltosyl-beta-cyclodextrin, 2-hydroxy-beta-cyclodextrin, 2-hydroxypropyl-beta-cyclodextrin, 2-hydroxypropyl-gamma-cyclodextrin, hydroxyethyl-beta-cyclodextrin, methyl-beta, cyclodextrin, sulfobutylether-alpha-cyclodextrin, sulfobutylether-beta-cyclodextrin, sulfobutylether-gamma-cyclodextrin, and combinations thereof.

Suitable thermoplastics include for example and without limitation, thermoplastics having a melting point of no greater than 200° C., preferably no greater than 100° C. such as polyethyleneterephthalate (PET), polylactic acid (PLA), polyvinyl chloride (PVC), polymethyl methacrylate (PMMA), polypropylene (PP), bisphenol-A polycarbonate (BPA-PC), polysulfone (PSF), polyether imide (PEI), and combinations thereof.

Suitable acrylates and methacrylates include for example cross-linked or polymerized acrylates including urethane acrylates, epoxy acrylates, polyester acrylates, acrylated (meth)acrylics, polyether acrylates, acrylated polyolefins, and combinations thereof, or their methacrylate analogs.

Other example of suitable binders include but are not limited to binders comprising polymers and polymerized materials selected from, gelatins, celluloses, ethyl cellulose, hydroxyl ethyl cellulose, hydroxyl propyl cellulose, methyl cellulose, hydroxy propyl cellulose, cellulose acetate, hydroxybutylmethyl cellulose, hydroxyethyl cellulose, hydroxyethylmethyl cellulose, glycoses, fructoses, gylcogens, collagens, starches, partially fluorinated thermoplastic fluoropolymers and combinations thereof.

Preferably, the materials are of low molecular weight such that they easily degrade at elevated temperatures for example at temperatures below and including 200° C., and can be easily removed.

The binder material may be present, for example, as particles or may be present, for example, as coating on the fluoropolymer particles. Particle sizes of the binder particles include, for example, from 1 to 150 μm ($D_{50}$), preferably about 5 μm to about 50 μm, and most preferably about 10 μm to about 30 μm. Generally, the average particle size of the binder particles preferably is larger than that of the fluoropolymer particles, for example by a factor between 2 and 100, preferably 2 and 10. The average particle size of the binder may be the number average and can be obtained by photographs and particle counting and measuring software.

The optimum amount of binder material may be determined by mainly two factors: first the amount of binder material should be high enough such that it allows the formation of layers of the desired dimensions, i.e. it has to be present in an effective amount. Secondly, the amount should be minimised with respect to the fluoropolymer content to minimise shrinking of the article during the working up process, to minimise the voids in the finished articles created during the removal step of the polymerized material. Since solid compositions are used, higher fluoropolymer concentrations may be used than in the liquid 3D printable compositions, for example a fluoropolymer content of up to 90% by weight or even up to 95% by weight (based on the weight of the composition). Typical amounts of binder material include but are not limited to amounts from about 5 to about 20%, from about 8 to about 18%, for example from about 10 to about 15% by weight based on the weight of the total composition.

The compositions may further comprise solid fillers or pigments. Fillers may include but are not limited to silicon carbide, boron nitride, molybdenum sulfide, aluminum oxides, and carbon particles, such as graphite or carbon black, carbon fibers, carbon nanotubes. The filler content can be optimized to the system used and may typically be between 0.01 to 10% or up to 30% weight based on the total weight of the composition depending on the fluoropolymer and binder materials used.

The fluoropolymer used in the 3D-printable compositions of this embodiment are preferably solids and in the form of particles. Typical particle size include particles of from about 1 to 150 μm ($D_{50}$). Particle size of solid particles can be determined by microscopy and particle counting software. Compositions of such particles size can be obtained by suspension polymerization of fluoropolymers, or by milling of pellets or billets, or by agglomeration of fluoropolymer particles obtained from emulsion polymerization. In one embodiment, the 3D printable composition is in the form of an extrudate, for example a filament. Such compositions are suitable for the filament deposition methods.

The composition may additionally contain curatives for curing the fluoroelastomer. The same curatives may be used as described above with respect to the polymerizable binder. They are preferably selected such that the curative is not activated during the additive processing. The same elastomers and curatives may be used as described for the liquid 3D-printable compositions above.

In one embodiment a blend of two or more fluoropolymers is used. The same blends can be used as described with respect to the polymerizable binders binders above.

In one embodiment the 3D printable composition comprises
from 20 to 95% wt. or from 70 to 90% wt. of a fluoroelastomer particles, preferably at a size between 1 and 150 μm;
from 5 to 70% or from 5 to 20% of a binder material that melts or liquefies at a temperature between 40 and 180° C., preferably between 50° C., and 100° C., preferably in the form of particles having a particle size of from 2 μm to 300 μm, or from 1 μm to 150 μm, from 0 to 10% wt. of curatives for curing the fluoropolymer,
from 0 to 50% wt. of fillers,
from 0 to 15% wt. of other ingredients wherein the total weight of the composition is 100%.

The solid composition of particles or the filament composition is entered into the additive processing machine (3D printer) providing the appropriate heat source, for example a 3D thermal printer (having a heat source, such a thermal print heads) or a selective laser sintering or melting printer having a laser as a heat source, as described above for selective laser melting, or the extrusion heat in case of FDM, to create a three-dimensional object. The resulting object, also referred to as "green body" may be removed from the unreacted powder or filament and subjected to a heat treatment to remove the meltable material. Conveniently this is carried out by heat treatment to degrade and/or evaporate the binder material. The temperatures are chosen such that the fluoropolymer article does not melt or gets destroyed. Such fluoropolymers articles will retain their shape. The heating and subsequent cooling regime may be controlled to avoid bending of the object or formation of cracks in the object. The article may be subjected to curing, preferably after the article has been created. Curing may be carried out prior or during the removal of the binder material.

The resulting object may then be subjected to another heat treatment at higher temperatures. The temperatures are chosen such that the fluoropolymer article does not melt or gets destroyed.

The final article may have shrunk to some extent compared to the green body. By doing control runs the shrinking can be taken into account when programming the additive processing machine. Shrinking can be minimised by maximizing the fluoropolymer content.

Articles

Articles of different shapes, designs and functions may be obtained by the additive processing methods described herein. Such shaped articles include but are not limited to bearings, for example friction bearings or piston bearings, gaskets, shaft seals, ring lip seals, washer seals, O-rings, grooved seals, valves and valve seats, connectors, lids, tubing and containers. The articles obtained by the described processes may be components of other articles. In particular articles of small dimensions may be conveniently produced by the methods described herein. In one embodiments fluoropolymer articles having at their longest axis or diameter of from about 0.1 to about 200 mm may be produced. Fluoropolymer articles of big and small dimensions can be produced. The size of the additive processing device may set a limitation to the size of the articles that can be produced. Articles of small dimensions may also be conveniently produced by the methods described herein. An article comprising a 3D-printed fluoroelastomer can be prepared having a longest axis (as the case may be this may also be a diameter) that is smaller than 1.0 cm or even smaller than 0.7 mm. In one embodiment small fluoroelastomer articles may be produced having a longest axis or diameter of from about 0.01 to about 1.0 mm, or from 0.7 to 1.5 cm. In another embodiment articles may be produced, for example articles having a smallest axis or diameter of at least 1.1 mm.

The fluoropolymers can be 3D-printed into articles that have at least one element or part of a defined geometrical shape. Defined geometrical shapes include but are not limited to circles, semicircles, ellipses, half-spheres, squares, rectangles, cubes, polygons (including but not limited to triangles hexagons, pentagons, and octagons) and polyhedrons. The shapes may be three-dimensional and include pyramids, cuboids, cubes, cylinders, half-cylinders, spheres, half-spheres). The shapes also include shapes composed of different shapes like diamonds (combination of two triangles). For example, a honeycomb structure contains several hexagons as geometrical elements. In one embodiment the geometrical shape has an axis or diameter of at least 0.5 millimetres, or at least one millimetre or at least 2 millimetres or at least one centimeter.

In one embodiment of the present disclosure a fluoropolymer article is produced containing a 3D-printed fluoropolymer that is a "green body". In such embodiment, the article comprises from 3 to 80% by weight of a polymerized binder material, for example a binder material obtained by the polymerization of the polymerizable binder material described herein.

In another embodiment of the present disclosure a fluoropolymer article is produced containing a shaped fluoropolymer that is a "green body". In such embodiment, the article comprises from 1 to 25% by weight of a reaction product of a combustion reaction of polymerized binder material, for example a binder material obtained by the polymerization of the polymerizable binder material described herein.

Fluoropolymer articles of different shapes, designs and functions may be obtained. Also articles comprising the fluoropolymer articles of different designs and functions may be obtained. Examples of articles and fluoropolymer articles include but are not limited to bearings, for example friction bearings or piston bearings, gaskets, shaft seals, ring lip seals, washer seals, O-rings, grooved seals, valves and valve seats, connectors, lids and containers. The article may be medical implants, chemical reactors, screws, cogwheels, joints, bolts, pumps, electrodes, heat exchangers, mixers, turbines, electrical transformers, electrical insulators, static mixers, extruders or the articles may be components of other articles including the above articles. The articles may be used in application where resistance to acids, bases, fuels, hydrocarbons is required, where non-stick properties are required, where heat resistance is required and combinations thereof.

Preferably, the articles or components thereof contain the 3D-printed fluoropolymer wherein the fluoropolymer has been 3D-printed into structures that contain one or more than one channels, perforations, honeycomb structures, essentially hollow structures and combinations thereof. Such structures may be flat, curved or spherical.

LIST OF PARTICULAR EMBODIMENTS

The following lists of exemplary embodiment is provided to further illustrate the present disclosure without intending to limit the disclosure to the specific embodiments listed.

List 1

1. Method of producing a fluoropolymer article comprising subjecting a composition comprising fluoropolymer particles to additive processing in an additive processing device containing at least one energy source.
2. The method of embodiment 1 wherein the composition comprises at least one binder material capable of binding the fluoropolymer particles to form a layer in a part of the composition that has been exposed to the energy source of the additive processing device and the method comprises subjecting a part of the composition to exposure of the energy source to form a layer.
3. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer.

4. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the energy source is selected from electromagnetic irradiation.

5. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the energy source is electromagnetic irradiation having single or multiple wavelengths between 10 nm and 1000 nm.

6. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the energy source comprises UV irradiation.

7. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the composition further comprises at least one polymerization initiator that is initiated by exposure to the energy source of the additive processing device.

8. The method of any one of the preceding embodiments wherein the binder material comprises polymerizable unsaturated bonds.

9. The method of any one of the preceding embodiments wherein the binder material comprises polymerizable groups selected from acrylates and methacrylates.

10. The method of any one of the preceding embodiments wherein the binder material comprises polymerizable acrylates and methacrylates selected from diacrylate, dimethacrylates, triacrylates, trimethacrylates, acrylates having four or more acrylate groups, methacrylates having four or more methacrylate groups and combinations thereof.

11. The method of any one of the preceding embodiments wherein the composition comprises an aqueous dispersion of fluoropolymer particles.

12. The method of any one of the preceding embodiments wherein the composition comprises fluoropolymer particles having a diameter from about 50 to 500 nm.

13. The method of any one of the preceding embodiments wherein the composition comprises fluoropolymer particles having an average particle size (Z-average) of from about 50 to about 500 nm.

14. The method of any one of the preceding embodiments wherein the composition comprises at least one binder material capable of binding fluoropolymer particles to form a layer in a part of the composition that has been exposed to the energy source by melting upon exposure of the composition to the energy source of the additive processing device, and wherein the method comprises subjecting a part of the composition to exposure of the energy source to form a layer.

15. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source.

16. The method of any one of the preceding embodiments wherein the composition comprises at least one binder material capable of binding fluoropolymer particles to form a layer in a part of the composition that has been exposed to the energy source of the additive processing device and wherein the binder material forms a layer by melting upon exposure of the composition to the energy source of the additive processing device and wherein the additive processing device is a 3D printer selected from selective laser sintering printers, selective laser melting printers, 3D thermal printer, electron beam melting printer.

17. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the binder material has a melting point of at least 40° C.

18. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the binder material is a wax.
19. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the composition is a solid composition of particles.
20. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the fluoropolymer particles have a particle size of from about 1 to about 500 µm, preferably from about 1 to about 150 µm.
21. The method of any one of the preceding embodiments wherein the fluoropolymer is a fluoroelastomer and wherein the composition further comprises a curative for curing the fluoroelastomer that is not activated during the additive processing.
22. The method of any one of the preceding embodiments further comprising at least one heat treatment to remove the binder material.
23. The method of any one of the preceding embodiments wherein the composition comprises at least one binder material capable of binding fluoropolymer particles to form a layer in an area exposed to the energy source of the additive processing device and wherein the method further comprises subjecting the article to a heat treatment to remove binder material by evaporation.
24. The method of any one of the preceding embodiments wherein the composition comprises at least one binder material capable of binding fluoropolymer particles to form a layer in an area exposed to the energy source of the additive processing device and wherein the method comprises subjecting the article to a heat treatment to remove binder by thermal degradation.
25. Fluoroelastomer article obtained by additive processing.
26. The article of embodiment 25 comprising from 0.1 to 30% by weight of one or more filter.
27. The article of any one of embodiments 25 to 26 obtainable by the additive processing of any one of embodiments 1 to 24.
28. An article comprising a component, wherein the component is a fluoroelastomer article obtained by additive processing according to any one of embodiments 1 to 24.
29. 3D-printable fluoropolymer composition for 3D printing with irradiation as energy source, the composition comprising fluoropolymer particles, a polymerizable binder material wherein the polymerizable binder material solidifies upon exposure of the composition to the energy source.
30. The 3D printable composition of embodiment 29, wherein the composition comprises a dispersion of fluoropolymer particles.
31. The 3D printable composition of embodiments 29 or 30 wherein the composition further comprises a polymerization initiator that initiates polymerization upon exposure to the energy source.
32. 3D-printable fluoropolymer composition for 3D printing using a heat source, the composition comprising fluoropolymer particles and a binder material that melts upon exposure of the composition to the energy source.
33. The 3D printable composition of embodiment 32, wherein the composition is a solid composition.
34. Use of a fluoropolymer composition for 3D printing using irradiation wherein the composition comprises fluoropolymer particles, a polymerizable binder material and a polymerization initiator that gets activated by irradiation.

Use of a fluoropolymer composition for 3D printing using a heat source, wherein the composition is a solid composition comprising fluoropolymer particles and a binder material that melts upon exposure to the heat source.

List 2

2.1. Method of producing a fluoropolymer article comprising subjecting a composition to additive processing in an additive processing device containing at least one energy source, wherein the composition comprises fluoropolymer particles and a binder material capable of binding the fluoropolymer particles to form a layer in a part of the composition that has been exposed to the energy source of the additive processing device and the method comprises subjecting a part of the composition to exposure of the energy source to form a layer and wherein the fluoropolymer is a fluoroelastomer.

2.2 The method according to any one of the preceding embodiments wherein the composition further comprises one or more curing agents for curing the fluoroelastomer, and the method further comprises subjecting the fluoroelastomer to curing.

2.3. The method according to any one of the preceding embodiments further comprising removing the binder material, 2.4. The method according to any one of the preceding embodiments wherein the fluoroelastomer comprises repeating units derived from tetrafluoroethene and one or more comonomers selected from hexafluoropropene, vinylidene fluoride and one or more perfluorinated alpha olefin ethers corresponding to the formula $$R^f-O-(CF_2)_n-CF=CF_2,$$

wherein n represents 1 or 0 and $R^f$ represents a linear or branched, cyclic or acyclic perfluorinated alkyl residue optionally being interrupted once or more than once by an oxygen atom and $R^f$ preferably having less than 12 carbon atoms, more preferably having up to 7 carbon atoms.

2.5. The method according to any one of the preceding embodiments wherein the fluoroelastomer has a glass transition temperature ($T_g$) of less than 25° C.

2.6. The method according to any one of the preceding embodiments wherein the binder material is polymerizable, and binds fluoropolymer particles by polymerizing upon exposure to the energy source.

2.7. The method according to any one of the preceding embodiments wherein the binder material is polymerizable and binds fluoropolymer particles by polymerizing upon exposure to the energy source comprises and wherein the binder material comprises polymerizable unsaturated bonds.

2.8. The method according to any one of the preceding embodiments wherein the composition is a dispersion of the fluoroelastomer particles in a fluid phase.

2.9. The method according to any one of the preceding embodiments wherein the binder material is polymerizable and comprises polymerizable groups selected from acrylate and methacrylate groups.

2.10. The method according to any one of the preceding embodiments wherein the binder material is polymerizable, and binds fluoropolymer particles by polymerizing upon exposure to the energy source and wherein the composition is a dispersion of the fluoroelastomer in a fluid phase and wherein the polymerizable binder comprises polymerizable groups selected from silane groups.

2.11. The method according to any one of the preceding embodiments wherein the binder material is polymerizable, and binds fluoropolymer particles by polymerizing upon exposure to the energy source and wherein the composition is an extrudable composition.

2.12. The method according to any one of the preceding embodiments wherein the binder material is polymerizable, and binds fluoropolymer particles by polymerizing upon exposure to the energy source and wherein the composition is an extrudable composition and wherein the polymerizable binder comprises polymerizable groups selected from acrylate and methacrylate groups.

2.13. The method according to any one of the preceding embodiments wherein the method comprises the steps:
(i) providing the composition containing the fluoropolymer particles and the binder material and optionally other ingredients and wherein the binder material is polymerizable, and binds fluoropolymer particles by polymerizing upon exposure to the energy source;
(ii) causing the binder material to polymerize and to bind fluoropolymer particles by either (a): directing energy from the energy source of the additive manufacturing device to a selected location of the 3D printable composition and causing the binder material to polymerize and to bind fluoropolymer particles in the selected location; or (b): directing a selected location of the 3D printable composition to the energy source and causing the binder material to polymerize and to bind fluoropolymer particles, or a combination of (a) and (b);
(iii) directing either (c) the energy source away from the 3D printable composition or (d) directing the 3D printable composition away from the energy source or both, to avoid the binder material polymerizing in the non-selected locations, or a combination of (c) and (d);
(iv) repeating steps (ii) and (iii), and if necessary also step (i), to form multiple layers and create an article.

2.14. The method according to any one of the preceding embodiments wherein the binder material melts or liquefies upon exposure to the energy source and binds the fluoropolymer particles.

2.15. The method according to any one of the preceding embodiments wherein the binder material melts or liquefies upon exposure to the energy source and binds the fluoropolymer particles and comprises organic particles selected from wax, sugars, dextrins, and thermoplastic polymers melting between 40° C., and 180° C., polyethylene glycols melting between 40° C., and 180° C., and polymerized or cross-linked acrylates, methacrylates and combinations thereof.

2.16. The method according to any one of the preceding embodiments wherein the binder material melts or liquefies upon exposure to the energy source and binds the fluoropolymer particles and wherein the composition is a solid composition of particles.

2.17. The method according to any one of the preceding embodiments wherein the binder material melts or liquefies upon exposure to the energy source and binds the fluoropolymer particles and wherein the composition has been extruded into a filament.

2.18. The method according to any one of the preceding embodiments wherein the binder material melts or liquefies upon exposure to the energy source and binds the fluoropolymer particles and wherein the composition has been extruded into a filament; and wherein in the energy source comprises a heated extrusion nozzle through which the composition is extruded.

2.19. The method according to any one of the preceding embodiments wherein the method comprises the steps:
(i) providing the composition containing the fluoropolymer particles and the binder material and optionally other ingredients and wherein the binder material melts or liquefies upon exposure to the energy source and binds the fluoropolymer particles;
(ii) causing the binder material to melt or liquefy and to bind fluoropolymer particles by either (a): directing energy from the energy source of the additive manufacturing device to a selected location of the 3D printable composition and causing the binder material to melt or liquefy and to bind fluoropolymer particles in the selected location; or (b): directing a selected location of the 3D printable composition to the energy source and causing the binder material to melt or liquefy and to bind fluoropolymer particles, or a combination of (a) and (b);
(iii) directing either (c) the energy source away from the 3D printable composition or (d) directing the 3D printable composition away from the energy source or both, to avoid the binder material to melt or liquefy and to bind fluoropolymer particles in the non-selected locations, or a combination of (c) and (d);
(iv) repeating steps (ii) and (iii), and if necessary also step (i), to form multiple layers and create an article.

2.20. A composition for producing an article by additive processing in an additive processing device, said composition comprising fluoropolymer particles, optionally one or more filler, and a binder material capable of binding the fluoropolymer particles upon exposure of the binder material to energy from an energy source of the additive processing device; wherein the fluoropolymer is a fluoroelastomer.

2.21. The composition of embodiment 2.20 wherein the fluoroelastomer comprises repeating units derived from tetrafluoroethene and one or more comonomers selected from hexafluoropropene, vinylidene fluoride and one or more perfluorinated alpha olefin ethers corresponding to the formula

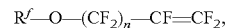

$$R'\text{—O—}(CF_2)_n\text{—}CF\text{=}CF_2,$$

wherein n represents 1 or 0 and $R_f$ represents a linear or branched, cyclic or acyclic perfluorinated alkyl residue optionally being interrupted once or more than once by an oxygen atom and $R_f$ preferably having less than 12 carbon atoms, more preferably having up to 7 carbon atoms.

2.22. The composition of embodiment 2.20 or 2.21 wherein the fluoroelastomer has a glass transition temperature ($T_g$) of less than 25° C.

2.23. The composition of embodiments 2.20 to 2.22 wherein the fluoropolymer particles have an average particle size ($D_{50}$) of from 50 to 500 nm.

2.24. The composition of embodiments 2.20 to 2.23 further comprising one or more curing agent for curing the fluoroelastomer.

2.25. The composition of embodiments 2.20 to 2.24 being a dispersion of fluoropolymer particles in a liquid phase and wherein the binder material is polymerizable and comprises polymerizable groups selected from acrylate and methacrylate groups.

2.26. The composition of embodiments 2.20 to 2.25 wherein the composition is an extrudable composition.

2.27. The composition of embodiments 2.20 to 2.26 wherein the binder material melts or liquefies upon exposure to the energy source and comprises organic particles selected from wax, sugars, dextrins, and thermoplastic polymers melting between 40° C., and 180° C.

2.28. The composition of embodiments 2.20 to 2.27 wherein the binder material melts or liquefies upon exposure to the energy source wherein the composition is a solid composition of particles.

2.29. The composition of embodiments 2.20 to 2.28 wherein the binder material melts or liquefies upon exposure to the energy source and comprises organic particles selected from wax, sugars, dextrins, and thermoplastic polymers melting between 40° C., and 180° C., and wherein the composition is a solid composition.

2.30. A composition comprising a 3D-printed fluoroelastomer.

2.31. The composition of embodiment 2.30 being obtainable by the method of any one of embodiments 2.1 to 2.19 inclusive.

2.32. An article comprising the 3D-printed fluoroelastomer of embodiment 2.30 or 2.31, the article being selected from friction bearings, piston bearings, gaskets, shaft seals, ring lip seals, washer seals, O-rings, valve seats, connectors and lids.

The disclosure will now be further illustrated by examples and test method without intending the disclosure to be limited to the tests and examples below.

Test Procedures

Average Particle Size:

Average particle size of polymer particles in a dispersion can be measured by electronic light scattering using a Malvern Autosizer 2c in accordance with ISO 13321. This method assumes a spherical particle size. The average particle sizes determined as the Z-average:

$$D_z = \frac{\sum S_i}{\sum \frac{S_i}{D_i}}$$

Wherein $S_i$ is the scattered intensity of particle i and $D_i$ is the diameter of particle i. This equation typically corresponds to the equation:

$$D_z = \frac{\sum D_i^6}{\sum D_i^5}$$

in the diameter range of the particles used herein. The particle sizes are expressed as the $D_{50}$ value.

Solid Content:

The solid content (fluoropolymer content) of the dispersions can be determined gravimetrically according to ISO 12086. A correction for non-volatile inorganic salts was not carried out.

Glass Transition Temperature (Tg):

The Tg can be measured by differential scanning calorimetry, for example using a TA Instruments Q200 modulated DSC. Conditions of measurements: heating rate from −150° C. to 50° C. at 2-3° C./minute. The modulation amplitude: +1/−1° C. per minute during 60 seconds.

Mooney Viscosity:

Mooney viscosities can be determined in accordance with ASTM D1646-07(2012), 1 minute pre-heat and a 10 minute test at 121° C. (ML 1+10 @ 121° C.).

Examples 1 to 3

Preparation of PFE UV Curable Dispersions 40 g of an aqueous dispersion comprising a perfluoroelastomer (TFE-PMVE copolymer containing nitrile groups as curing sites; PFE 191 TLZ, 27% solid content, obtained from Dyneon GmbH, Burgkirchen, Germany) was added into a 60 mL amber glass jar under magnetically stirring at 400-500 rpm. A pre-mixed solution of binder material SR-344 (5.0 g), SR-415 (5.0 g) (both from Sartomer USA, LLC (Exton, Pa. 19341), and IRGACURE 2022 (0.05 g, from BASF Corporation (Wyandotte, Mich. 48192) was dropwise added into the perfluoroelastomer dispersion and stirred until it became homogenous. The dispersions were allowed to sit over night before use.

For additional curing agents, either hexamine (0.50 g) or $CF_3OC_3F_6OCF(CF_3)COONH_4$ (0.40 g) was dissolved into previous PFE dispersions. The final solutions were translucent.

TABLE 1

| Different formulations of PFE UV curable dispersions | | | |
|---|---|---|---|
| Example | 1 | 2 | 3 |
| PFE 191TLZ | 40 g | 40 g | 40 g |
| SR 344 | 5.0 g | 5.0 g | 5.0 g |
| SR 415 | 5.0 g | 5.0 g | 5.0 g |
| Irgacure 2022 | 0.05 g | 0.05 g | 0.05 g |
| Hexamine | — | 0.50 g | |
| $CF_3OC_3F_6OCF(CF_3)COONH_4$ | | | 0.40 g |

The solutions were used to produce sheets by additive manufacturing (VAT polymerization). Additive manufacturing was carried out in a commercially available desktop 3D printer, Asiga PICO 2 (a high power LED @385 nm as the UV source). After printing, the gel samples were carefully detached with a razor blade from the aluminum platform. The samples were dried under air and then under vacuum to remove water.

They were further treated at different temperature for curing and removing binder.

The freshly 3D-printed PFE sheets were typically translucent and fragile due to water remaining inside the sheets. They had a dimension of approximately 47×30×2.5 mm (l×w×h). After a first heating step (drying under ambient environment overnight followed by drying under vacuum (@50° C.) for 3 hrs, the sheets were dry and turned white. The sheets had a dimension of about 34×22×1.7 mm (l×w×h). The sheets had a gel-like, rubbery consistency. After a second heat treatment (200° C. for 24 hours), the sheets turned brown and became stiffer. The dimensions were about 31×20×1.5 mm. After a second heat treatment (350° C. for 72 hours) the sheets become harder. The dimensions were approximately about 25×16×1.0 mm determined using a ruler.

The samples were analyzed before and after the different heating stages by ATR-IR. Attenuated Total Reflectance (ATR) is a technique by which an infrared (IR) spectrum of a surface is measured. The samples were pressed onto an IR-transparent crystal using substantial pressure to ensure uniform contact between the crystal and sample surface. During analysis, an IR beam is reflected from the inner surface of the crystal, such that it penetrates the sample with a depth of a few microns or less. Each sample was cut by a razor blade. The freshly cut surfaces of samples were placed on Ge crystal window to collect the spectrum. ATR-IR spectra with 4 cm$^{-1}$ resolution were acquired from a Pike SmartMIRacle ATR accessory with a single-reflection horizontal germanium (Ge) crystal. The accessory was inserted into the sample compartment of an iS50 FTIR spectrometer from Thermo Nicolet with a room-temperature KBr-DTGS detector. Each spectrum was acquired with 32 scans and a spectral range of 4000-650 cm$^{-1}$.

All ATR-IR spectra of the freshly prepared 3D-printed sheets showed small peaks at 2262 cm$^{-1}$ indicating the nitrile (—CN) curing sites from PFE fluoroelastomer backbone. Because of the low concentration of the nitrile functionality in the total mass, the intensity of the signal was small. The sharp peaks at 1725 cm$^{-1}$ were the characteristic peaks of carbonyl groups (C=O) from acrylate binder (SR-344 and SR-415).

After the heat-treatment at 200° C. overnight, the ATR-IR spectra showed that the sample made from Example #1 still had the peak attributed to the —CN curing sites (2262 cm$^{-1}$). Samples made from Example #2 (with curing additive hexamine) and Example #3 (with curing additive $CF_3OC_3F_6OCF(CF_3)COONH_4$) had no detectable signals at 2262 cm$^{-1}$. This is an indication that crosslinking of the perfluoroelastomers occurred.

Under the same conditions, the persistence of 1725 cm$^{-1}$ peaks from all the samples is an indication that acrylate binder molecules were still present.

ATR-IR spectra of the samples were subsequently treated at 350° C. for 72 hrs before cooling to room temperature showed no C=O peaks anymore, except for the sample from experiment 1 but the peak was very small. This indicates that acrylate binders degraded under this heat treatment.

The invention claimed is:

1. A method of producing a fluoropolymer article comprising subjecting a composition to additive processing in an additive processing device containing at least one energy source, wherein the composition comprises curable fluoropolymer particles and a binder material capable of binding the curable fluoropolymer particles to form a layer in a part of the composition that has been exposed to the energy source of the additive processing device and the method comprises subjecting a part of the composition to exposure of the energy source to form a layer and wherein the fluoropolymer is a fluoroelastomer, and wherein (i) the binder material is polymerizable and binds the curable fluoropolymer particles by polymerizing upon exposure to the energy source, or (ii) the binder material melts or liquefies upon exposure to the energy source and binds the curable fluoropolymer particles.

2. The method of claim 1, wherein the composition further comprises one or more curing agents for curing the curable fluoropolymer, and the method further comprises subjecting the curable fluoropolymer to curing.

3. The method of claim 1 further comprising removing the binder material.

4. The method of claim 1, wherein the fluoroelastomer comprises repeating units derived from tetrafluoroethene and one or more comonomers selected from hexafluoropropene, vinylidene fluoride and one or more perfluorinated alpha olefin ethers corresponding to the formula

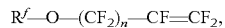

$R^f$—O—$(CF_2)_n$—CF=$CF_2$, wherein n represents 1 or 0 and $R^f$ represents a linear or branched, cyclic or acyclic perfluorinated alkyl residue optionally being interrupted once or more than once by an oxygen atom and $R^f$.

5. The method of claim 1, wherein the binder material is polymerizable, and binds the curable fluoropolymer particles by polymerizing upon exposure to the energy source.

6. The method of claim 5, wherein the composition is a dispersion of the fluoroelastomer in a fluid phase.

7. The method of claim 6, wherein the polymerizable binder comprises polymerizable groups selected from acrylate and methacrylate groups.

8. The method of claim 6, wherein the polymerizable binder comprises polymerizable groups selected from silane groups.

9. The method of claim 5, wherein the composition is an extrudable composition.

10. The method of claim 1 comprising the steps:
   (i) providing the composition containing the curable fluoropolymer particles and the binder material and optionally other ingredients and wherein the binder material is polymerizable, and binds curable fluoropolymer particles by polymerizing upon exposure to the energy source;
   (ii) causing the binder material to polymerize and to bind curable fluoropolymer particles by either (a): directing energy from the energy source of the additive manufacturing device to a selected location of the 3D printable composition and causing the binder material to polymerize and to bind curable fluoropolymer particles in the selected location; or (b): directing a selected location of the 3D printable composition to the energy source and causing the binder material to polymerize and to bind curable fluoropolymer particles, or a combination of (a) and (b);
   (iii) directing either (c) the energy source away from the 3D printable composition or (d) directing the 3D printable composition away from the energy source to avoid the binder material polymerizing in the non-selected locations, or a combination of (c) and (d); and
   (iv) repeating steps (ii) and (iii), and if necessary also step (i), to form multiple layers and create an article.

11. The method of claim 1, wherein the binder material melts or liquefies upon exposure to the energy source and binds the curable fluoropolymer particles.

12. The method of claim 11, wherein the binder material comprises organic particles selected from wax, sugars, dextrins, and thermoplastic polymers melting between 40° C. and 180° C., polyethylene glycols melting between 40° C. and 180° C. and polymerized or cross-linked acrylates, methacrylates and combinations thereof.

13. The method of claim 12, wherein the composition is a solid composition of particles.

14. The method of claim 11, wherein the composition has been extruded into a filament.

15. The method of claim 1, comprising the steps:
(i) providing the composition containing the curable fluoropolymer particles and the binder material and optionally other ingredients and wherein the binder material melts or liquefies upon exposure to the energy source and binds the curable fluoropolymer particles;
(ii) causing the binder material to melt or liquefy and to bind curable fluoropolymer particles by either (a): directing energy from the energy source of the additive manufacturing device to a selected location of the 3D printable composition and causing the binder material to melt or liquefy and to bind curable fluoropolymer particles in the selected location; or (b): directing a selected location of the 3D printable composition to the energy source and causing the binder material to melt or liquefy and to bind curable fluoropolymer particles, or a combination of (a) and (b);
(iii) directing either (c) the energy source away from the 3D printable composition or (d) directing the 3D printable composition away from the energy source to avoid the binder material to melt or liquefy and to bind curable fluoropolymer particles in the non-selected locations, or a combination of (c) and (d); and
(iv) repeating steps (ii) and (iii), and if necessary also step (i), to form multiple layers and create an article.

16. The method of claim 1, wherein the curable fluoropolymer is amorphous.

17. The method of claim 1, wherein the curable fluoropolymer has a glass transition temperature of less than 25° C.

18. The method of claim 1, wherein the curable fluoropolymer contains cure sites selected from the group consisting of iodine, bromine and nitrile groups.

* * * * *